US008857368B2

(12) United States Patent
Huskamp et al.

(10) Patent No.: US 8,857,368 B2
(45) Date of Patent: Oct. 14, 2014

(54) AIRCRAFT LOCATION SYSTEM FOR LOCATING AIRCRAFT IN WATER ENVIRONMENTS

(75) Inventors: Christopher Shane Huskamp, St. Louis, MO (US); Bonnie Louise Gorsic, Fountain Valley, CA (US)

(73) Assignee: The Boeing Company, Chicago, IL (US)

(*) Notice: Subject to any disclaimer, the term of this patent is extended or adjusted under 35 U.S.C. 154(b) by 268 days.

(21) Appl. No.: 13/238,533

(22) Filed: Sep. 21, 2011

(65) Prior Publication Data

US 2013/0070556 A1    Mar. 21, 2013

(51) Int. Cl.
| | |
|---|---|
| *G01S 13/86* | (2006.01) |
| *G01S 15/06* | (2006.01) |
| *B60Q 1/26* | (2006.01) |
| *G01S 15/88* | (2006.01) |
| *G01S 13/93* | (2006.01) |
| *B64D 45/00* | (2006.01) |

(52) U.S. Cl.
CPC .............. *G01S 15/06* (2013.01); *G01S 13/86* (2013.01); *B60Q 1/26* (2013.01); *G01S 13/93* (2013.01); *G01S 15/88* (2013.01); *B64D 2045/0065* (2013.01); *B64D 45/00* (2013.01)
USPC ............ 116/210; 181/175; 367/101; 367/102

(58) Field of Classification Search
CPC ........ B60Q 1/26; B60Q 1/2657; G01S 13/86; G01S 13/93
USPC ............... 367/101, 102, 6; 116/220; 310/322, 310/334, 335
See application file for complete search history.

(56) References Cited

U.S. PATENT DOCUMENTS

| | | | | |
|---|---|---|---|---|
| 1,836,495 A | * | 12/1931 | Paulson ...................... | 116/210 |
| 2,347,016 A | | 4/1944 | Adams et al. | |
| 2,470,783 A | | 5/1949 | Mead | |
| 3,675,190 A | * | 7/1972 | Auer et al. .................. | 367/93 |
| 3,901,352 A | | 8/1975 | Cluzel | |
| 3,945,338 A | | 3/1976 | Correa | |
| 4,744,083 A | * | 5/1988 | O'Neill et al. ............... | 714/704 |
| 5,283,643 A | * | 2/1994 | Fujimoto ..................... | 348/143 |
| 8,162,098 B2 | | 4/2012 | Emery et al. | |
| 2003/0152145 A1 | * | 8/2003 | Kawakita ................. | 375/240.12 |
| 2004/0233785 A1 | * | 11/2004 | Szajnowski ................ | 367/124 |
| 2008/0284651 A1 | * | 11/2008 | Pearson et al. ............. | 342/372 |
| 2011/0100745 A1 | | 5/2011 | Emery et al. | |

FOREIGN PATENT DOCUMENTS

| | | |
|---|---|---|
| WO | WO0153850 A1 | 7/2001 |
| WO | WO2011012877 A2 | 2/2011 |
| WO | WO2011067334 A1 | 6/2011 |

OTHER PUBLICATIONS

PCT search report dated Feb. 4, 2013 regarding application PCT/US2012/051758, filed Aug. 21, 2012, reference 11-0942-WOPCT, applicant The Boeing Company, 11 pages.
"Subsea Asset Location, The Sonar Bell," Salt Subsea Asset Location Technologies Ltd., 3 pages, accessed Sep. 21, 2011, http://www.cesalt.co.uk/.

(Continued)

*Primary Examiner* — Luke Ratcliffe
*Assistant Examiner* — Hovhannes Baghdasaryan
(74) *Attorney, Agent, or Firm* — Yee & Associates, P.C.

(57) ABSTRACT

A method and apparatus for an aircraft location system comprising an aircraft structure and a number of acoustic reflectors associated with the aircraft structure. The number of acoustic reflectors is configured to generate first sound signals in response to receiving second sound signals.

29 Claims, 25 Drawing Sheets

(56) References Cited

OTHER PUBLICATIONS

"DK120 Underwater Acoustic Beacon," Specifications, RJE International, Inc., 2 pages, accessed Sep. 21, 2011, http://www.rjeint.com/pdf/DK120.PDF.

"Intellectual Property," Salt Subsea Asset Location Technologies Ltd., 1 page, accessed Sep. 21, 2011, http://www.cesalt.co.uk/corporate/Intellectual-Property/.

* cited by examiner

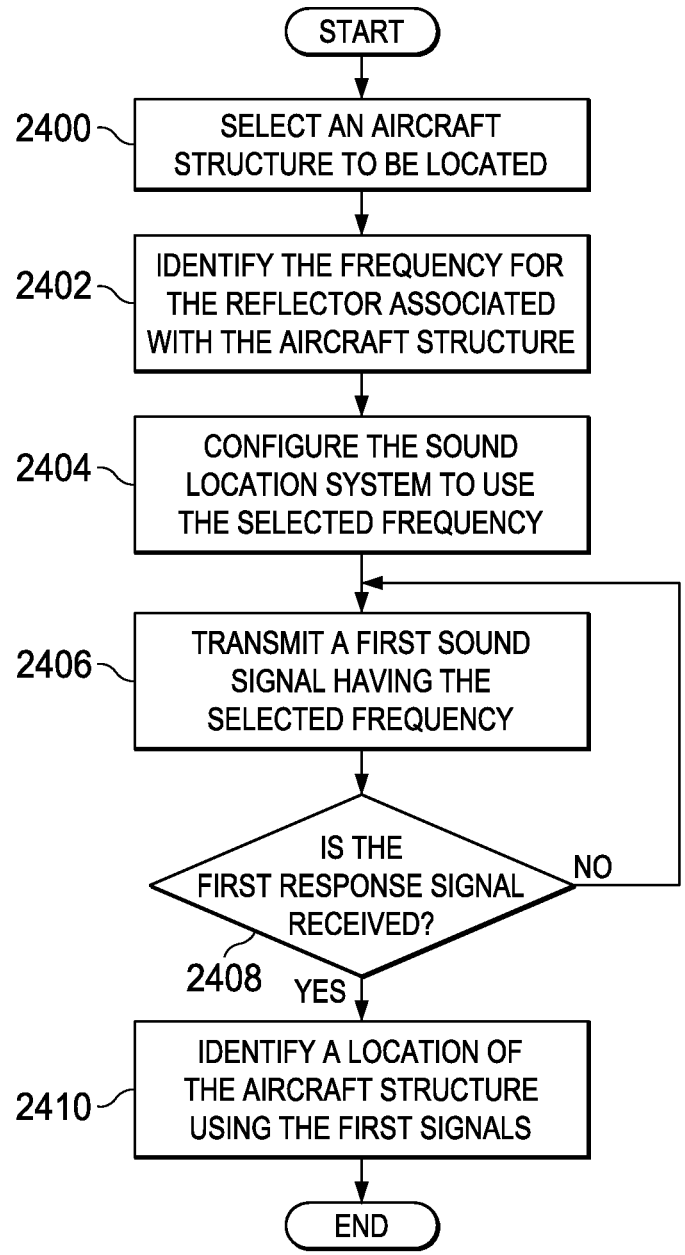

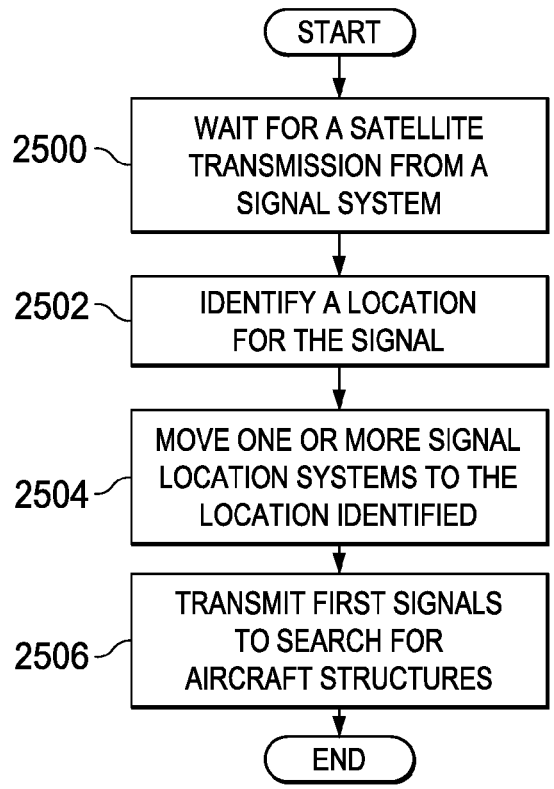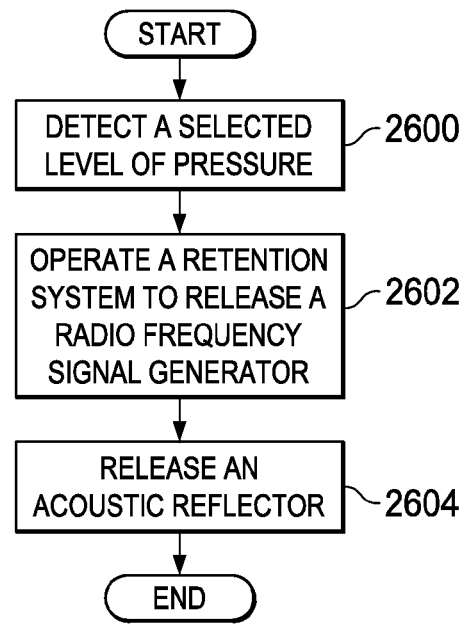

AIRCRAFT LOCATION SYSTEM FOR LOCATING AIRCRAFT IN WATER ENVIRONMENTS

BACKGROUND INFORMATION

1. Field

The present disclosure relates generally to aircraft and, in particular, to locating aircraft. Still more particularly, the present disclosure relates to a method and apparatus for locating aircraft in a water environment after an unintended encounter with the water environment.

2. Background

Aircraft are commonly used to transport people and cargo. Aircraft may fly over various types of terrain when traveling from a start location to a destination location. The terrain may include flat land, mountains, bodies of water, and other types of terrain.

Occasionally, an aircraft may have an unintended encounter with terrain. When these events occur, investigations are performed to identify a cause for the unintended encounter with terrain. The analysis may be used to make improvements to aircraft, the operation of aircraft, and/or some combination of the two.

When identifying a cause for an unintended encounter with terrain, it is often desirable to locate the aircraft or any debris from the aircraft for analysis. An unintended encounter with terrain may result in debris including different structures from the aircraft. These structures may include, for example, without limitation, a wing, an engine, a section of the fuselage, a data recorder, and/or other components. The different structures may be analyzed to determine whether an inconsistency may have contributed to the unintended encounter with terrain. Data recorders may be used to analyze information that occurred during flight of aircraft. These data recorders may include audio recording devices that record conversation of the flight crew as well as ambient noise in the background of areas, such as the cockpit. Data recorders also may record data, commands, and/or other information sent between different computers and devices within the aircraft during flight. For example, data about positions of control surfaces, engine performance, temperatures, and/or other information may be obtained from these data recorders. These data recorders may be referred to as flight data recorders or black boxes.

Data recorders have signal transmitters. The signal transmitters may be used to locate the data recorders. In particular, these data recorders may include sound-based signal transmitters. These sound-based signal transmitters may be especially useful if the unintended encounter with terrain was in the form of a water environment.

When an aircraft has an unintended encounter with terrain in the form of a water environment, the different structures may quickly sink into the water. Some water environments may be especially deep such that visual identification of the aircraft by traveling over the location may not be possible. The sound transmitters used with the data recorders may be used to locate the data recorders in a water environment.

These data recorders, however, may only transmit sound signals for some limited period of time, because the data recorders rely on battery power. As a result, if the location of the debris for the aircraft cannot be located before the transmitter transmitting the sound signals depletes the power in the battery, finding the data recorders and other debris may be especially difficult. In some cases, the data recorders may not be found for years or may never be found. Further, because debris spread in a water environment is unpredictable, data recorders are often found in different areas from other aircraft structures. Without finding the debris, analysis of the unintended encounter with the water environment cannot be properly made in most cases.

Thus, it would be advantageous to have a method and apparatus that takes into account at least some of the issues discussed above as well as possibly other issues.

SUMMARY

In one advantageous embodiment, an aircraft location system comprises an aircraft structure and a number of acoustic reflectors associated with the aircraft structure. The number of acoustic reflectors is configured to generate first sound signals in response to receiving second sound signals.

In another advantageous embodiment, an aircraft location system comprises a sound location system. The sound location system is configured to send a first sound signal having a first frequency into a water environment. The first frequency corresponds to a first acoustic reflector associated with a first aircraft structure for an aircraft that has unintentionally encountered the water environment. The sound location system is further configured to send a second sound signal into the water environment using a second frequency when a response signal is received from the first acoustic reflector. The second sound signal corresponds to the second frequency for a second acoustic reflector associated with a second aircraft structure for the aircraft that has unintentionally encountered the water environment.

In yet another advantageous embodiment, a method for locating aircraft structures is provided. A first sound signal is sent into a water environment using a first frequency. The first frequency corresponds to a first selected frequency for a first acoustic reflector associated with a first aircraft structure for an aircraft that has unintentionally encountered the water environment. A second sound signal is sent into the water environment using a second frequency when a response signal is received from the first acoustic reflector. The second sound signal corresponds to a second selected frequency for a second acoustic reflector associated with a second aircraft structure for the aircraft that has unintentionally encountered the water environment.

In yet another advantageous embodiment, a method for locating aircraft structures is provided. A radio frequency signal transmitted from a radio frequency signal generator associated with an aircraft structure for an aircraft that has unintentionally encountered a water environment is detected by a satellite. An approximate location of the aircraft structure is identified from the radio frequency signal. A sound signal is sent into the water environment at a location based on the approximate location of the aircraft structure. The sound signal has a frequency that corresponds to a selected frequency for an acoustic reflector associated with the aircraft structure. A location of the aircraft structure is identified when a response signal is received from the acoustic reflector. The location is identified using the response signal.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

FIG. 24 is an illustration of a flowchart of a process for locating aircraft structures in accordance with an advantageous embodiment;

FIG. 25 is an illustration of a flowchart of a process for identifying the location of aircraft parts in accordance with an advantageous embodiment;

FIG. 26 is an illustration of a flowchart of a process for generating signals for use in locating aircraft structures in accordance with an advantageous embodiment.

DETAILED DESCRIPTION

The different advantageous embodiments recognize and take into account that currently-used signal systems may only generate signals for a limited period of time, because these systems are powered signal systems. The different advantageous embodiments recognize and take into account that when a signal system uses power, the battery or batteries for the signal system may only last for some limited period of time.

The different advantageous embodiments also recognize and take into account that currently-used signal systems for data recorders continuously transmit signals. As a result, this type of transmission may only last for about 30 days with currently-used signal systems. Thus, when the power is depleted, finding a data recorder may be much more difficult in a water environment, such as water environment 108 in FIG. 1.

The different advantageous embodiments recognize and take into account that additional batteries or larger batteries may be used with signal systems. This type of solution, however, may increase the weight of data recorders more than desired.

Thus, the different advantageous embodiments provide a method and apparatus for locating aircraft structures in a water environment. The different advantageous embodiments use passive signal systems that may include sound generators, such as acoustic reflectors. For example, in one advantageous embodiment, an aircraft location system comprises an aircraft structure and a number of acoustic reflectors associated with the aircraft structure. The number of acoustic reflectors is configured to generate first sound signals in response to receiving second sound signals.

Figure 1:
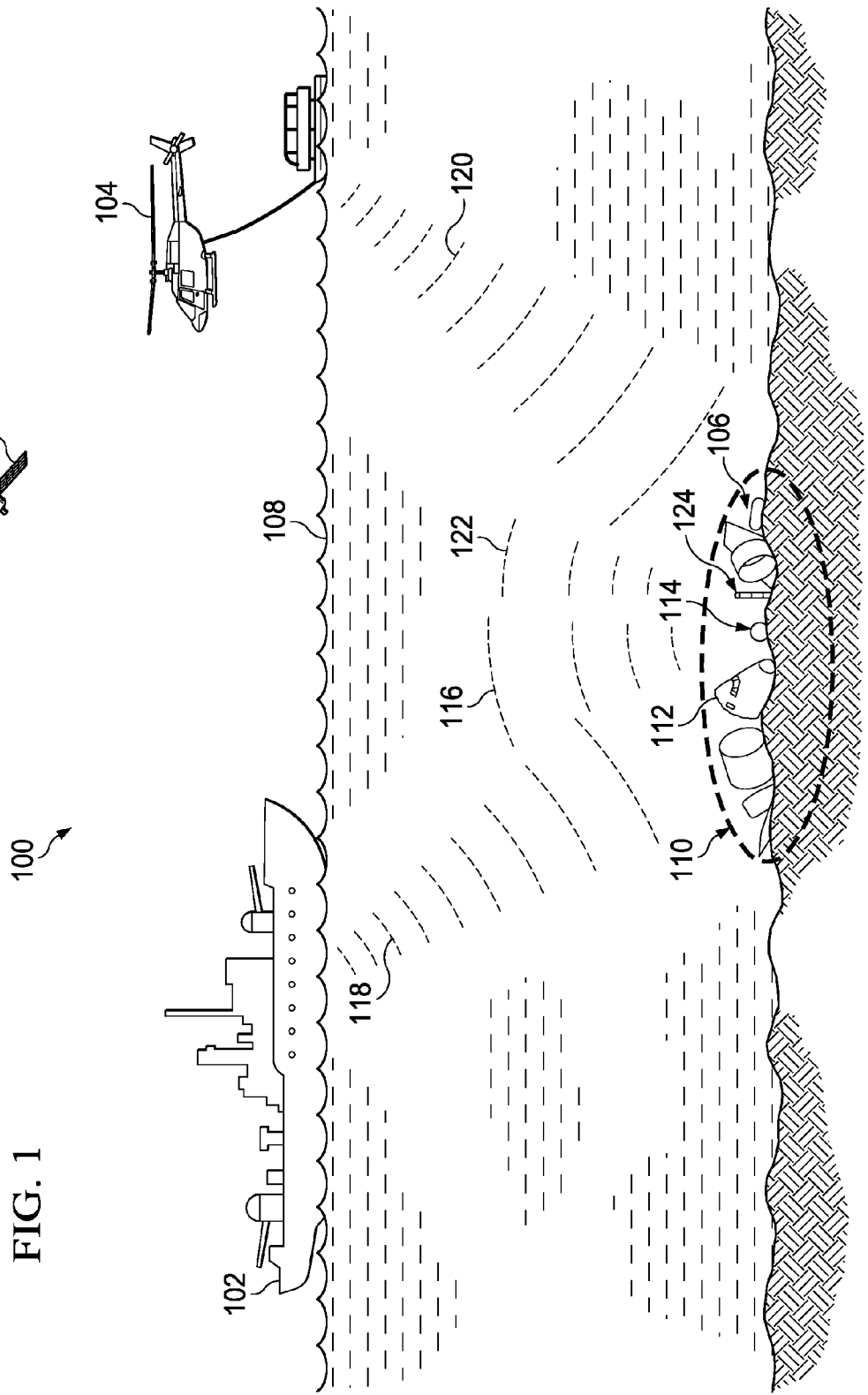
FIG. 1 is an illustration of an aircraft location environment in which an advantageous embodiment may be implemented.

With reference now to FIG. 1, an illustration of an aircraft location environment is depicted in accordance with an advantageous embodiment. In this illustrative example, aircraft location environment 100 includes surface ship 102 and helicopter 104. Surface ship 102 and helicopter 104 may include sound detection systems in the form of sonar systems.

Surface ship 102 and helicopter 104 may search for debris 106 from an aircraft that had an unintended encounter with water environment 108. In these illustrative examples, water environment 108 may be any body of water. Water environment 108 may be, for example, without limitation, a lake, a sea, an ocean, and/or some other suitable type of body of water.

In this illustrative example, debris 106 is located in debris field 110. Debris field 110 is an area in which debris 106 for the aircraft is located.

In these illustrative examples, debris 106 may include aircraft structures 112. Aircraft structures 112 may be, for example, without limitation, one of a wing, an engine or engine housing, a section of the fuselage, a data recorder, and/or other components or structures. In these illustrative examples, one or more of aircraft structures 112 are associated with one or more signal generators for signal system 114 in accordance with an advantageous embodiment.

The association is a physical association in these depicted examples. A first component, such as one of aircraft structures 112, may be considered to be associated with a second component, such as a signal generator in signal system 114, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

One or more advantageous embodiments may be implemented in signal system 114. In these illustrative examples, signal system 114 does not rely on powered signal transmitters. Rather, signal system 114 may allow surface ship 102, helicopter 104, or both to locate aircraft structures 112 in debris field 110.

For example, signal system 114 generates first signals 116 in response to receiving second signals 118 from surface ship 102. In another example, first signals 116 also may be generated in response to receiving third signals 120 from helicopter 104.

In some advantageous embodiments, signal system 114 also may comprise one or more powered signal transmitters, such as a radio-frequency transmitter. In addition to generating first signals 116 in response to receiving second signals 118, signal system 114 may generate other signals, such as radio-frequency signals 122. Radio-frequency signals 122 transmitted from radio-frequency transmitter 124 in signal system 114 may be received by satellite 126 in this illustrative example.

For example, signal system 114 may generate radio-frequency signals 122 that can be detected by satellite 126. Radio-frequency signals 122 may determine a location that may provide an initial location for aircraft structures 112 in debris field 110. Surface ship 102 and helicopter 104 may use this initial location to more quickly locate aircraft structures 112 in debris field 110.

Figure 2:
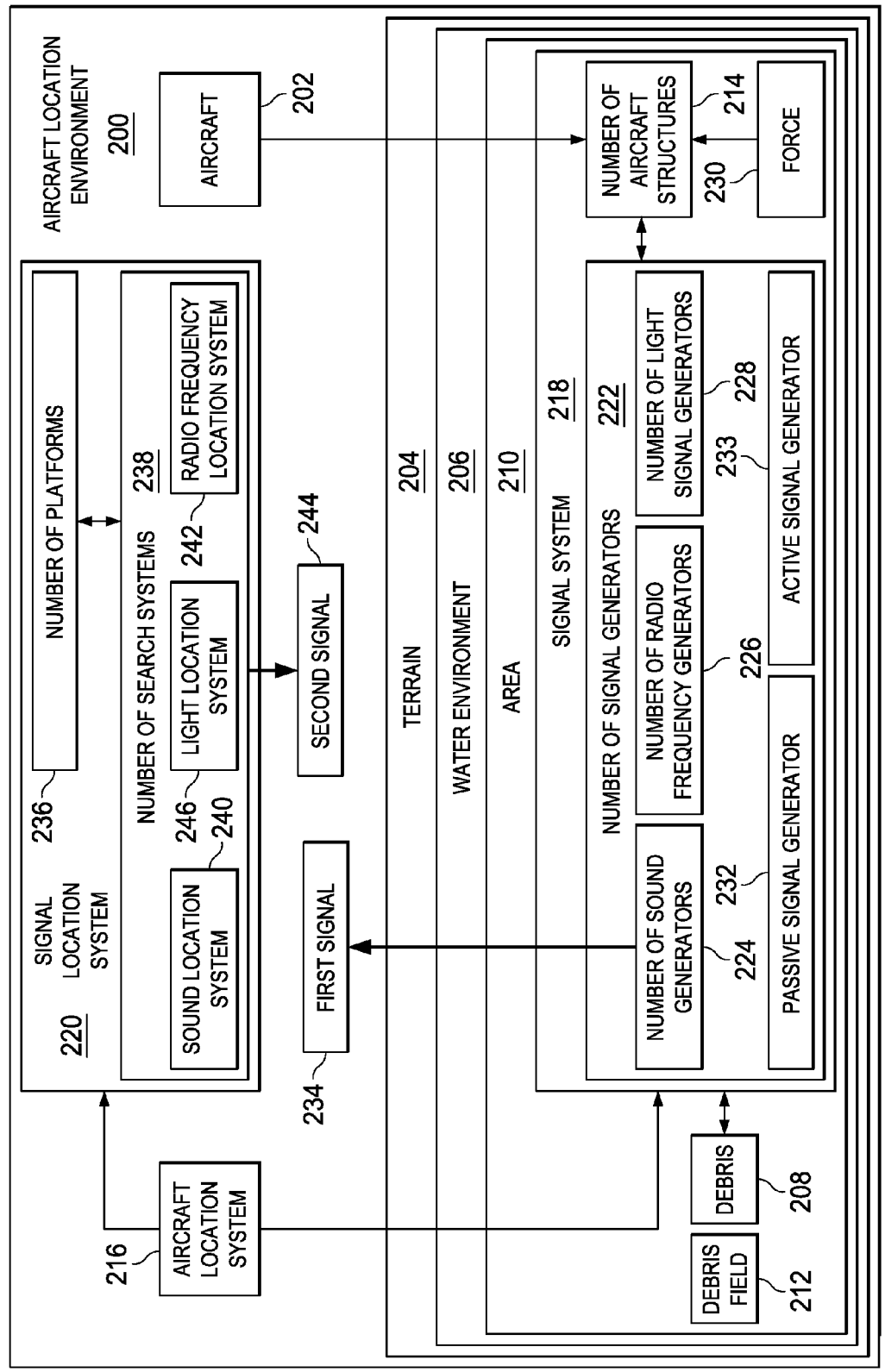
FIG. 2 is an illustration of a block diagram of an aircraft location environment in accordance with an advantageous embodiment.

With reference now to FIG. 2, an illustration of a block diagram of an aircraft location environment is depicted in accordance with an advantageous embodiment. Aircraft location environment 100 in FIG. 1 is an example of one implementation for aircraft location environment 200 shown in block form in FIG. 2.

In this illustrative example, aircraft 202 may have an unintended encounter with terrain 204 which takes the form of water environment 206 in the illustrative examples. When aircraft 202 has an unintended encounter with water environment 206, debris 208 may result. Debris 208 may be in area 210. Area 210 takes the form of debris field 212 when debris 208 is present. Debris 208 may include number of aircraft structures 214.

In this illustrative example, number of aircraft structures 214 may be located using aircraft location system 216. Aircraft location system 216 comprises signal system 218 and signal location system 220.

In these illustrative examples, signal system 218 is associated with number of aircraft structures 214. As used herein, "a number" when used with reference to items, means one or more items. For example, "number of aircraft structures 214" is one or more aircraft structures.

Signal system 218 may be associated with number of aircraft structures 214 by being associated with one or more of the aircraft structures in number of aircraft structures 214. In other words, signal system 218 may not need to be associated with every aircraft structure in number of aircraft structures 214. In these illustrative examples, signal system 218 includes number of signal generators 222.

Number of signal generators 222 may include a number of different types of signal generators. For example, number of signal generators 222 may include at least one of number of sound generators 224, number of radio frequency (RF) generators 226, number of light signal generators 228, and other suitable types of signal generation devices.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, item B and item C, item C, or item B.

In these illustrative examples, the association of number of signal generators 222 with number of aircraft structures 214 is such that number of signal generators 222 may operate after aircraft 202 has an unintended encounter with water environment 206.

In these illustrative examples, number of signal generators 222 may be associated with number of aircraft structures 214 in a manner such that number of signal generators 222 may be able to withstand force 230 occurring from an unintended encounter with water environment 206.

In these illustrative examples, number of signal generators 222 may be configured to withstand force 230 occurring more than once. In these illustrative examples, force 230 may be, for example, without limitation, a G-force of up to about 40 Gs.

Further, in these illustrative examples, at least one of number of signal generators 222 is passive signal generator 232. Passive signal generator 232 may be one of number of sound generators 224. At least one of number of signal generators 222 also may include active signal generator 233. Active signal generator 233 may be one of number of radio frequency generators 226 or number of light signal generators 228 and use power such as that from a battery or other energy source to operate. Passive signal generator 232 does not require power to operate. When first signal 234 is generated by number of signal generators 222 without using power, passive signal generator 232 may last longer than active signal generator 233. In this manner, the likelihood of finding number of aircraft structures 214 may increase even if number of aircraft structures 214 is not located within a period of time, such as about 30 days or about 60 days.

When using passive signal generator 232, the likelihood of finding number of aircraft structures 214 increases, because passive signal generator 232 may operate longer than active signal generator 233, as long as passive signal generator 232 survives force 230.

In these illustrative examples, the search for number of aircraft structures 214 in debris field 212 may occur using number of platforms 236 in aircraft location system 216. Number of platforms 236 may be a number of mobile platforms in these examples. Aircraft location system 216 includes number of platforms 236 and number of search systems 238.

In these illustrative examples, number of platforms 236 has number of search systems 238 associated with number of platforms 236. Number of search systems 238 is configured to search for number of signal generators 222. For example, one or more of number of search systems 238 may each include sound location system 240, radio frequency location system 242, light location system 246, and/or other types of search systems. In this illustrative example, each platform in number of platforms 236 may include one or more search systems from number of search systems 238.

In these illustrative examples, sound location system 240 generates second signal 244. Number of sound generators 224 may generate first signal 234 when second signal 244 is received. In these examples, first signal 234 and second signal 244 take the form of sound signals. Sound signals may also be referred to as sound waves.

The other signal generators may be used in addition to or in conjunction with number of signal generators 222 to aid in the location of number of aircraft structures 214. By using number of search systems 238, number of platforms 236 may locate an aircraft structure associated with a signal generator. When the aircraft structure is found, other aircraft structures may be located close enough to the identified signal generator even though these aircraft structures may not be associated with signal generators themselves.

Figure 3:
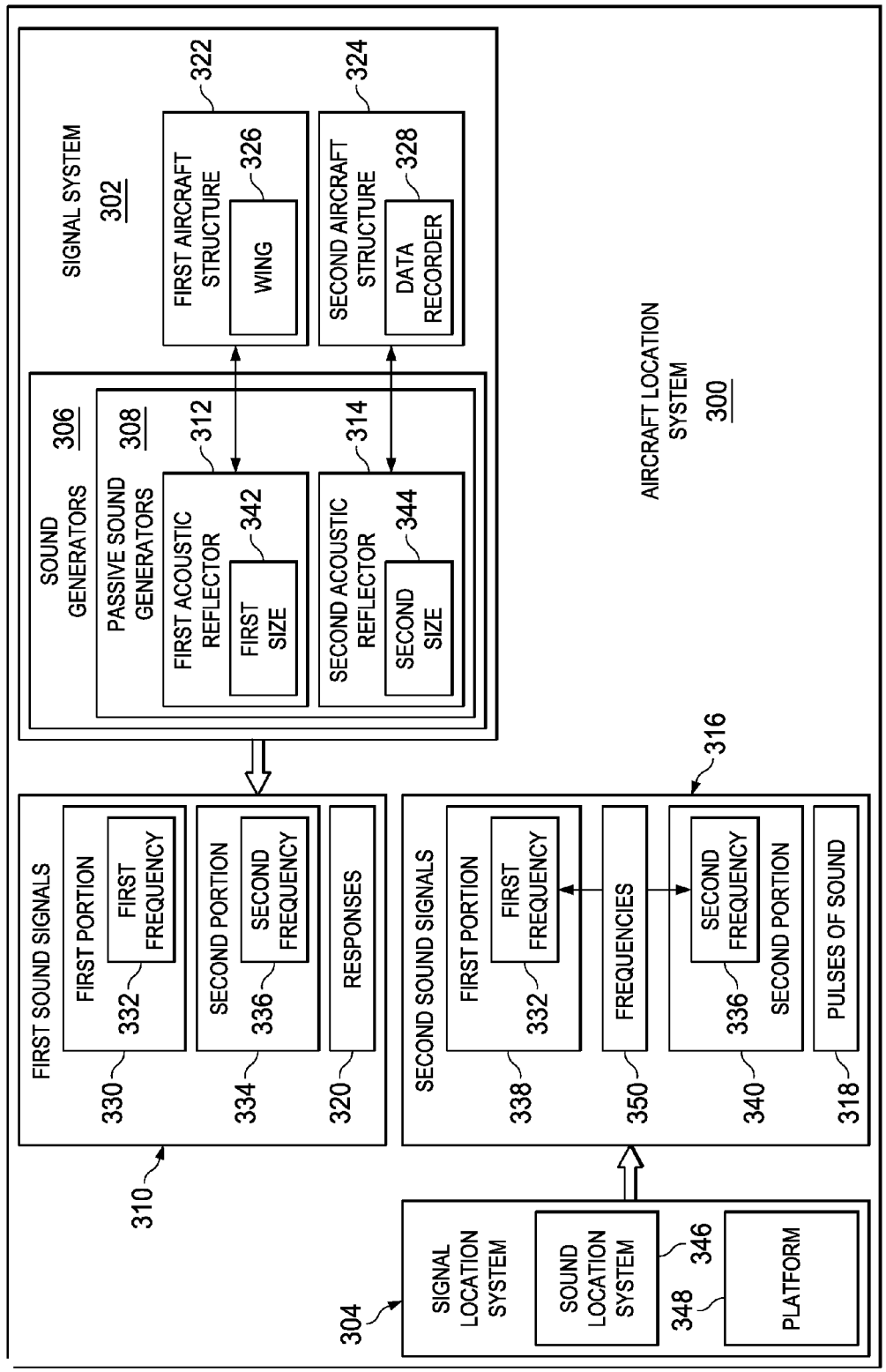
FIG. 3 is an illustration of a block diagram of an aircraft location system in accordance with an advantageous embodiment.

With reference now to FIG. 3, an illustration of a block diagram of an aircraft location system is depicted in accordance with an advantageous embodiment. In this illustrative example, aircraft location system 300 is an example of an implementation for aircraft location system 216 in FIG. 2.

As depicted, aircraft location system 300 includes signal system 302 and signal location system 304. In this illustrative example, signal system 302 comprises sound generators 306. Sound generators 306 take the form of passive sound generators 308. Passive sound generators 308 do not require a power source to generate first sound signals 310.

In this illustrative example, passive sound generators 308 comprise first acoustic reflector 312 and second acoustic reflector 314. An acoustic reflector is a sound generator that generates first sound signals 310 in response to receiving second sound signals 316 from signal location system 304 in these illustrative examples. Second sound signals 316 take the form of pulses of sound 318. A pulse of sound in pulses of sound 318 may also be referred to as a "ping". First sound signals 310 are responses 320 to pulses of sound 318 generated by at least one of first acoustic reflector 312 and second acoustic reflector 314. In these illustrative examples, responses 320 may be referred to as "echoes".

As depicted, first acoustic reflector 312 may be associated with first aircraft structure 322. Second acoustic reflector 314 may be associated with second aircraft structure 324. In these illustrative examples, first aircraft structure 322 and second aircraft structure 324 may not be connected to each other in the debris field. For example, first aircraft structure 322 may be wing 326. Second aircraft structure 324 may be data recorder 328.

In these illustrative examples, first acoustic reflector 312 may generate first portion 330 of first sound signals 310 with first frequency 332. Second acoustic reflector 314 generates second portion 334 of first sound signals 310 having second frequency 336. In these illustrative examples, first frequency 332 may be different from second frequency 336.

In particular, first frequency 332 may be lower in frequency than second frequency 336. With a lower frequency, first portion 330 of first sound signals 310 travels farther than second portion 334 of first sound signals 310.

Further, in these illustrative examples, first acoustic reflector 312 generates first portion 330 of first sound signals 310 when receiving first portion 338 of second sound signals 316 having first frequency 332. Second acoustic reflector 314 generates second portion 334 of first sound signals 310 in response to receiving second portion 340 of second sound signals 316 having second frequency 336. In other words, because first acoustic reflector 312 and second acoustic reflector 314 are passive sound generators, these acoustic reflectors respond to signals using the same frequency as the signals that were received.

With the use of first acoustic reflector 312 and second acoustic reflector 314, particular structures may be identified based on selecting a particular frequency. For example, wing 326 may be identified separately from data recorder 328 based on the frequency selected in second sound signals 316.

Further, the use of different frequencies may be used to identify some aircraft structures before other aircraft structures. For example, wing 326 may detach from the different advantageous embodiments of the aircraft farther out in the debris field than data recorder 328.

In these illustrative examples, first acoustic reflector 312 may have first size 342, and second acoustic reflector 314 may have second size 344. In these illustrative examples, first size 342 is greater than second size 344 when first frequency 332 is lower than second frequency 336. As a result, first size 342 may be easier to associate with wing 326 than data recorder 328.

As a result, placing first acoustic reflector 312 with first size 342 in wing 326 may result in finding wing 326 first. Once an aircraft structure, such as wing 326, is found in a debris field, the aircraft location system can use the position of the aircraft structure to locate other aircraft structures in the debris field. For example, when wing 326 is found, second frequency 336 may be used to find the location of second acoustic reflector 314 associated with data recorder 328.

In these illustrative examples, signal location system 304 may comprise sound location system 346. Sound location system 346 may be configured to generate second sound signals 316 using a range of frequencies including first frequency 332 and second frequency 336. In the illustrative examples, the range at which first frequency 332 and second frequency 336 may be detected are different. For example, first sound signals 310 with first frequency 332 may have a longer range than second sound signals 316 with second frequency 336.

Signal location system 304 comprises sound location system 346 and platform 348. Sound location system 346 is associated with platform 348. Platform 348 may take various forms. For example, without limitation, platform 348 may be a surface ship, a submarine, an unmanned underwater vehicle (UUV), a helicopter, a barge, or some other suitable type of platform. In these illustrative examples, sound location system 346 is a sonar-based sound location system. Sound location system 346 is configured to transmit second sound signals 316 with frequencies 350. As depicted, frequencies 350 include first frequency 332 and second frequency 336. In this manner, sound location system 346 may selectively transmit first portion 338 and second portion 340 in second sound signals 316 to perform a search for wing 326 and data recorder 328.

The illustration of aircraft location system 300 in FIG. 3 is not meant to limit the manner in which other advantageous embodiments may be implemented. For example, in other implementations, passive sound generators 308 may include only a single acoustic reflector or may include other or more acoustic reflectors instead of two acoustic reflectors as described.

Figure 4:
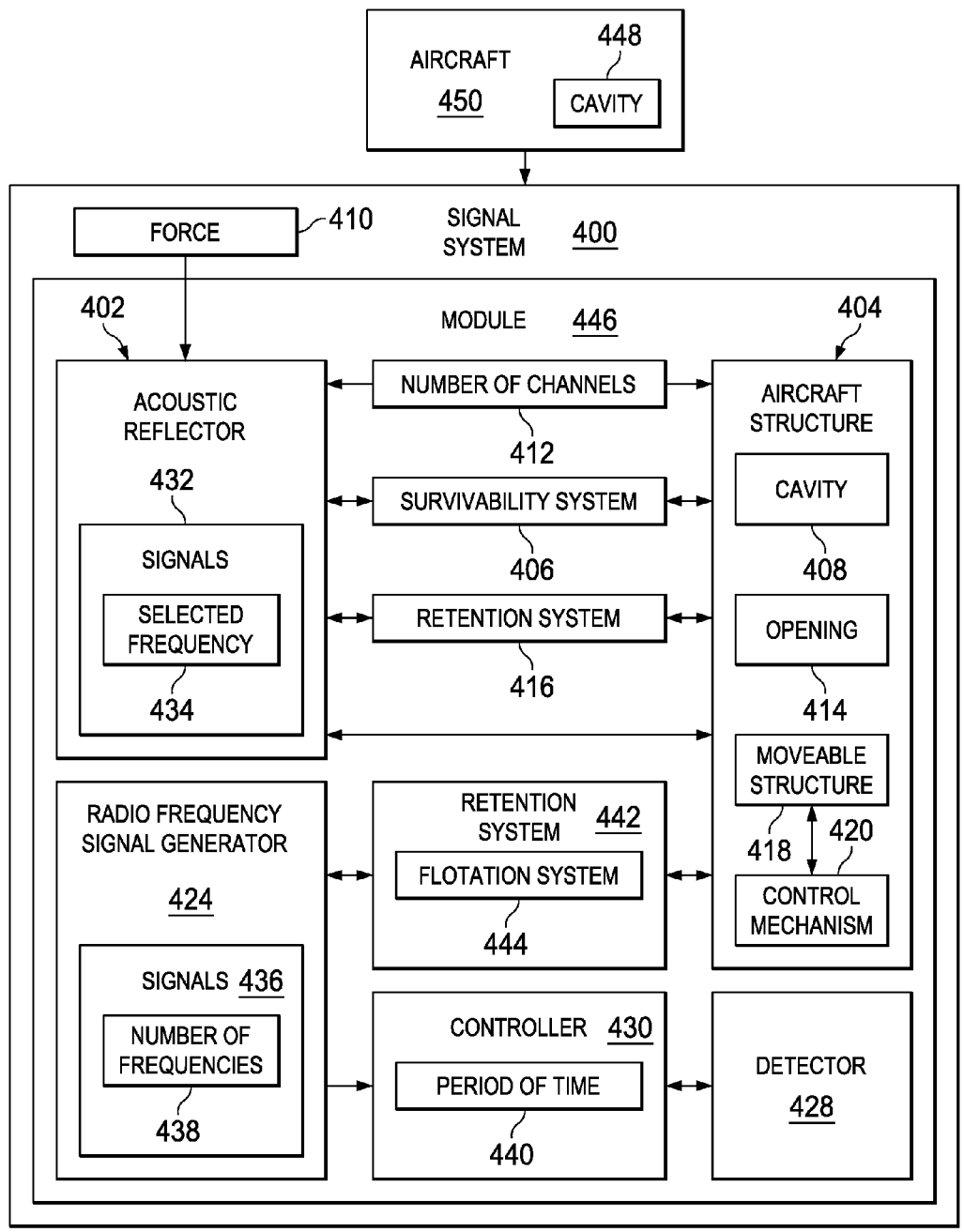
FIG. 4 is an illustration of a block diagram of a signal system in accordance with an advantageous embodiment.

Turning next to FIG. 4, an illustration of a signal system is depicted in block form in accordance with an advantageous embodiment. Signal system 400 is an example of an implementation for signal system 218 in number of signal generators 222 in FIG. 2. In this illustrative example, signal system 400 comprises acoustic reflector 402, aircraft structure 404, and survivability system 406.

In this illustrative example, acoustic reflector 402 may be configured to be held in cavity 408 within aircraft structure 404. Aircraft structure 404 is a structure configured for use in aircraft 202 in FIG. 2. Aircraft structure 404 may be connected to another aircraft structure or located within an aircraft structure in aircraft 202 in FIG. 2.

Survivability system 406 is configured to protect acoustic reflector 402 from force 410 that may be exerted on aircraft structure 404 in response to an unintended encounter of an aircraft with a water environment in which signal system 400 is located. Survivability system 406 may reduce force 410 applied to aircraft structure 404 from being applied to acoustic reflector 402.

In these illustrative examples, survivability system 406 may include part or all of aircraft structure 404 in the illustrative examples. Survivability system 406 may be configured to allow acoustic reflector 402 to withstand a force occurring from an unintended encounter of an aircraft with a water environment. In other words, at least one of aircraft structure 404 and survivability system 406 may reduce the force applied to acoustic reflector 402 from an impact of an aircraft with a water environment. In these illustrative examples, survivability system 406 may include aircraft structure 404 or may be a separate component from aircraft structure 404.

Survivability system 406 may be configured to protect acoustic reflector 402 from force 410 having a g-force of up to about 40 Gs. Of course, survivability system 406 may be configured to protect acoustic reflector 402 from force 410 having greater values for the g-force, depending on the particular implementation.

As depicted, aircraft structure 404 may include number of channels 412. Number of channels 412 connects an exterior of aircraft structure 404 with cavity 408. Number of channels 412 may allow water to enter cavity 408 in aircraft structure 404. In this manner, acoustic reflector 402 may be at least partially submerged in water when aircraft structure 404 is under water. Further, survivability system 406 also is configured to allow water to reach acoustic reflector 402. Aircraft structure 404 and survivability system 406 may be comprised of materials that do not interfere with the transmission of sound waves in these illustrative examples. In other words, aircraft structure 404, survivability system 406, or both, may not reduce the amplitude or distort sound waves that may pass through these components to and from acoustic reflector 402.

In some illustrative examples, aircraft structure 404 may include opening 414. Opening 414 may be used in addition to and/or in place of number of channels 412. Opening 414 is configured to allow acoustic reflector 402 to leave cavity 408 in aircraft structure 404.

In these illustrative examples, retention system 416 may connect acoustic reflector 402 to aircraft structure 404. Retention system 416 may prevent acoustic reflector 402 from leaving cavity 408 through opening 414 until after aircraft structure 404 becomes submerged in water.

Retention system 416 may take a number of different forms. For example, without limitation, retention system 416 may be a cable connecting acoustic reflector 402 to aircraft structure 404. In another example, the cable may include a net or mesh that holds acoustic reflector 402 with the mesh being connected to aircraft structure 404. Retention system 416 may be made of a material, such as, for example, without limitation, nylon, aramid synthetic fiber, steel cable, synthetic string, aircraft cable, urethane-coiled cord, or other suitable types of materials.

Further, in some illustrative examples, retention system 416 may include moveable structure 418. As depicted, moveable structure 418 may selectively cover or uncover opening 414. Moveable structure 418 may be, for example, a door, an iris diaphragm, or some other structure that may selectively cover and uncover opening 414.

In still another illustrative example, control mechanism 420 may control the movement of moveable structure 418. For example, control mechanism 420 may be a pressure-based mechanism that moves moveable structure 418 to expose opening 414 when a selected amount of pressure is detected by control mechanism 420. In another example, control mechanism 420 may move moveable structure 418 after some period of time after detecting the selected amount of pressure.

In still another illustrative example, signal system 400 also may include radio frequency signal generator 424. Radio frequency signal generator 424 may be another acoustic reflector or may be a different type of signal generation system. In one illustrative example, radio frequency signal generator 424 may be one of number of radio frequency generators 226 in FIG. 2.

In addition, detector 428 and controller 430 may be used with radio frequency signal generator 424 in these illustrative examples. Detector 428 may be configured to detect signals 432 generated by acoustic reflector 402 at selected frequency 434.

If signals 432 are detected, controller 430 may then activate radio frequency signal generator 424. In these illustrative examples, radio frequency signal generator 424 generates signals 436 at number of frequencies 438. Number of frequencies 438 may be a single frequency, multiple frequencies, or a range of a spectrum of frequencies. In these illustrative examples, number of frequencies 438 may be those used for radio communications, satellite communications, or other suitable types of communications.

Controller 430 may activate radio frequency signal generator 424 for period of time 440. After period of time 440 passes, controller 430 may turn off radio frequency signal generator 424. If signals 432 are detected again prior to period of time 440 passing, controller 430 resets period of time 440. In other words, if period of time 440 is about one minute and signals 432 are detected after period of time 440 has begun, period of time 440 is again set to about one minute. In the illustrative examples, period of time 440 may be selected to increase the operating time of a signal generator, such as radio frequency signal generator 424

In these illustrative examples, radio frequency signal generator 424 also may have retention system 442. Retention system 442 may connect radio frequency signal generator 424 to aircraft structure 404. In some illustrative examples, retention system 442 may also include flotation system 444. Flotation system 444 may be configured to detach from aircraft structure 404 and carry radio frequency signal generator 424 toward the surface of the water. In some cases, flotation system 444 may reach the surface of the water, depending on the depth at which aircraft structure 404 is located.

In still other illustrative examples, radio frequency signal generator 424 also may take the form of a light signal generator. Further, additional signal generators also may be present in aircraft structure 404.

In still other illustrative examples, signal system 400 may take the form of module 446. Module 446 may be configured to be placed into cavity 448 in aircraft 450. For example, module 446 may be placed into a cavity in a section of the fuselage, a wing, an engine housing, a door, a monument, a floor, or some other part of aircraft 450. In these illustrative examples, module 446 may be configured to be flushed with other components, such as the skin of aircraft 450 when installed in cavity 448 in aircraft 450.

Figure 5:
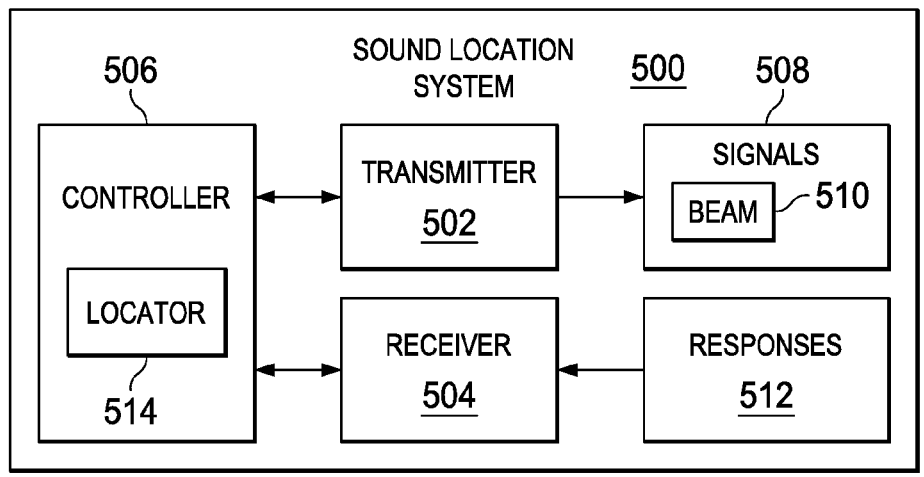
FIG. 5 is an illustration of a sound location system in accordance with an advantageous embodiment.

With reference now to FIG. 5, an illustration of a sound location system is depicted in accordance with an advantageous embodiment. Sound location system 500 is an example of one implementation for sound location system 240 in FIG. 2.

As depicted, sound location system 500 comprises transmitter 502, receiver 504, and controller 506. Transmitter 502 is configured to generate signals 508. Signals 508 may take the form of beam 510, depending on the particular implementation. Signals 508 are sound signals in this example. Receiver 504 is configured to receive responses 512. Responses 512 are sound signals generated in response to the transmission of signals 508.

Controller 506 is configured to control the operation of transmitter 502 and receiver 504. Additionally, controller 506 may include locator 514. Locator 514 is configured to identify a location of an aircraft structure based on responses 512. In these illustrative examples, locator 514 and controller 506 may be implemented using hardware, software, or a combination of the two.

Figure 6:
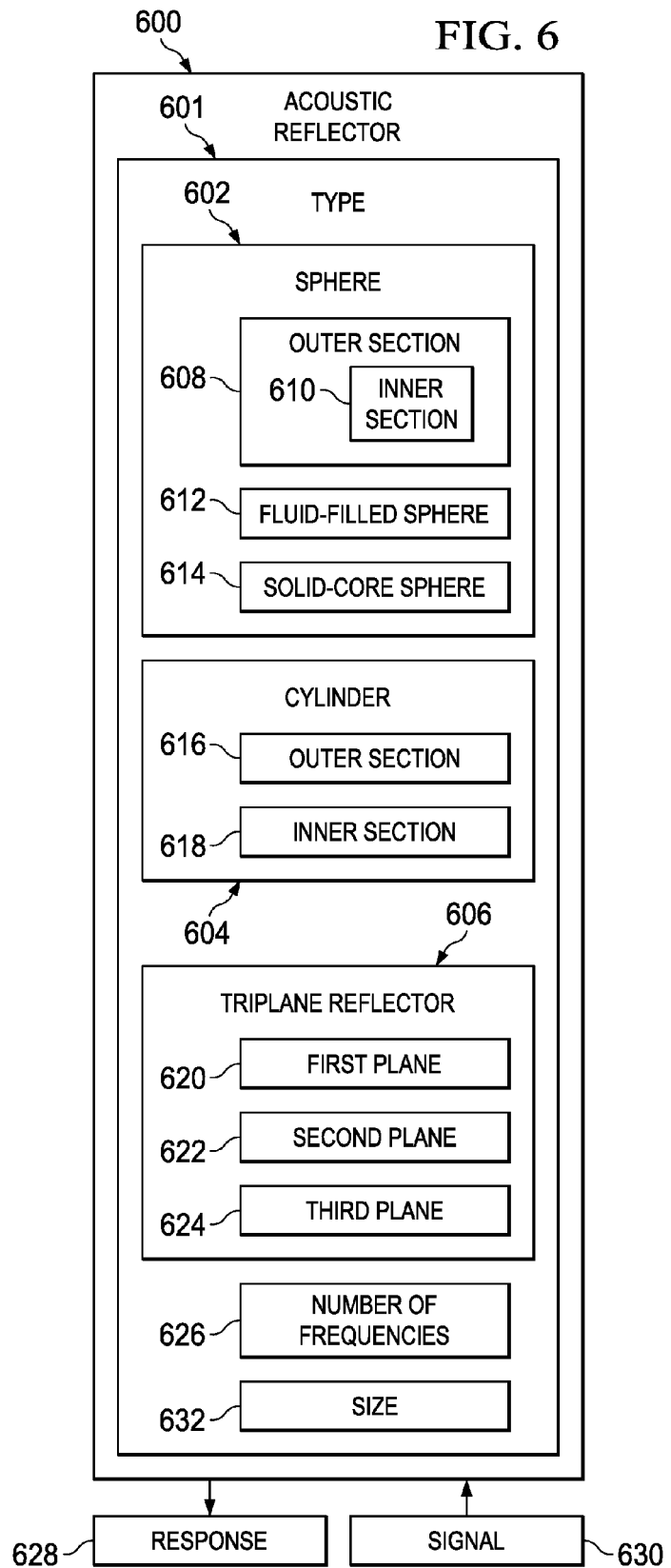
FIG. 6 is an illustration of an acoustic reflector in accordance with an advantageous embodiment.

Turning next to FIG. 6, an illustration of an acoustic reflector is depicted in accordance with an advantageous embodiment. Acoustic reflector 600 is an example of an implementation for a sound generator in number of sound generators 224 in FIG. 2. Acoustic reflector 600 also may be used to implement first acoustic reflector 312 and second acoustic reflector 314 in FIG. 3.

In these illustrative examples, acoustic reflector 600 has type 601. Type 601 may take various forms. For example, without limitation, type 601 may be, one of a standard corner reflector, a retro-reflector, an acoustic mirror, and/or another suitable type of acoustic reflector. In this illustrative example, type 601 may be sphere 602, cylinder 604, or triplane reflector 606.

In this illustrative example, sphere 602 may have outer section 608 with inner section 610. Outer section 608 surrounds inner section 610 and is a shell for sphere 602. Inner section 610 is a core for sphere 602 in this illustrative example. When inner section 610 is a fluid, sphere 602 is fluid-filled sphere 612. When inner section 610 is a solid, sphere 602 is solid-core sphere 614. Solid-core sphere 614 may be configured to take into account pressure equalization for underwater conditions.

Sphere 602 may receive sound signals and increase the amplitude of the response relative to the sound signals received. Cylinder 604 also has outer section 616 and inner section 618. Inner section 618 also may be a solid or a fluid. Triplane reflector 606 may comprise first plane 620, second plane 622, and third plane 624. These planes may be arranged orthogonally to each other.

Acoustic reflector 600 also has number of frequencies 626. Number of frequencies 626 is one or more frequencies at which acoustic reflector 600 will generate response 628. For example, if acoustic reflector 600 is configured for about 450 kHz, acoustic reflector 600 will generate response 628 when signal 630 is received by acoustic reflector 600. Both response 628 and signal 630 have the same frequency in these illustrative examples. In some cases, acoustic reflector 600 may generate responses to more than one frequency. Number of frequencies 626 may be individual frequencies with other frequencies located in between ranges, bands of frequencies, or some combination thereof. In these illustrative examples, number of frequencies 626 may be from about 50 kHz to about 900 kHz.

Acoustic reflector 600 also has size 632. Size 632 may vary, depending on the frequencies selected for acoustic reflector 600. For example, when acoustic reflector 600 takes the form of sphere 602, sphere 602 may have about a 100 mm diameter when sphere 602 is selected to respond to signal 630 at a frequency in number of frequencies 626 of about 450 kHz. As another example, when sphere 602 is selected to respond to signal 630 at a frequency in number of frequencies 626, sphere 602 may have a size of about 200 mm in diameter.

Figure 7:
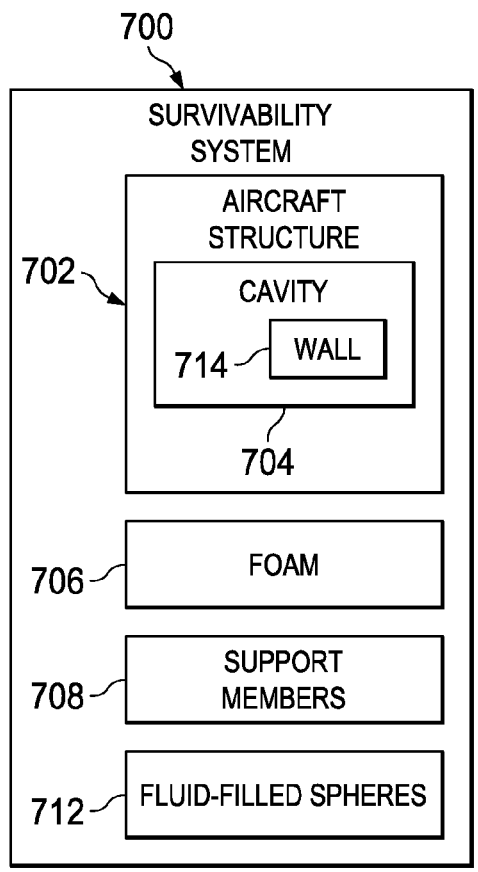
FIG. 7 is an illustration of a block diagram of a survivability system in accordance with an advantageous embodiment.

Turning now to FIG. 7, an illustration of a block diagram of a survivability system is depicted in accordance with an advantageous embodiment. Survivability system 700 is an example of an implementation for survivability system 406 in FIG. 4.

In this illustrative example, survivability system 700 may comprise a number of different components. For example, survivability system 700 may include aircraft structure 702. Aircraft structure 702 may have cavity 704 in which an acoustic reflector may be placed.

Aircraft structure 702 may be configured to provide protection against a force that may occur when aircraft structure 702 has an unintended encounter with a water environment. Aircraft structure 702 may be comprised of different materials. For example, aircraft structure 702 may have a material selected from at least one of a composite material, a metal, aluminum, titanium, plastic, and other suitable materials.

Survivability system 700 also may include other components, such as foam 706, support members 708, fluid-filled spheres 712, and other suitable components. These components may be located in cavity 704 of aircraft structure 702 and may provide further protection against a force that may occur with an unintended encounter with a water environment.

Foam 706 may be configured to surround the acoustic reflector inside of cavity 704. Foam 706 may have a material selected from at least one of open cell or closed cell polyurethane, aerogel, ceramic, foam rubber, polystyrene, expanded polystyrene, synactic foam, integral skin foam, ballistic foam, and other suitable types of material. Depending on the embodiment, foam 706 may be selected such that an acoustic reflector will be surrounded with water.

In one advantageous embodiment, when the acoustic reflector is configured to be released out of the cavity in the aircraft structure into the surrounding water environment, the foam may be made of one that is non-porous. In an advantageous embodiment in which the acoustic reflector is configured to be retained within the aircraft structure, the foam may allow water to flow into the cavity to reach the acoustic reflector.

Support members 708 may be connected to the acoustic reflector, the foam, the retention system, or another component of survivability system 700, and wall 714 in cavity 704 of aircraft structure 702. This connection may suspend the acoustic reflector within cavity 704. These support members may be elastic, flexible, or both.

Fluid-filled spheres 712 may be located in cavity 704 with the acoustic reflector. Fluid-filled spheres 712 may be configured to be located between the acoustic reflector and wall 714 of cavity 704 in aircraft structure 702.

The illustration of aircraft location environments and the components used to locate aircraft structures shown in block form in FIGS. 2-7 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, wing 326 and data recorder 328 are examples of aircraft structures described in the figures above. The different advantageous embodiments may be applied to other aircraft structures in addition to these. For example, the different advantageous embodiments may be applied to aircraft structures, such as a horizontal stabilizer, a tail section, an engine housing, an aircraft, a door, an aileron, a flap, and other suitable types of aircraft structures. In still other illustrative examples, number of search systems 238 may only include a single type of search system rather than multiple search systems.

The different components shown in FIG. 1 and FIGS. 8-22 may be combined with components in FIGS. 1-4, used with components in FIGS. 1-4, or a combination of the two. Additionally, some of the components in these figures may be illustrative examples of how components shown in block form in FIGS. 1-4 can be implemented as physical structures.

Figure 8:
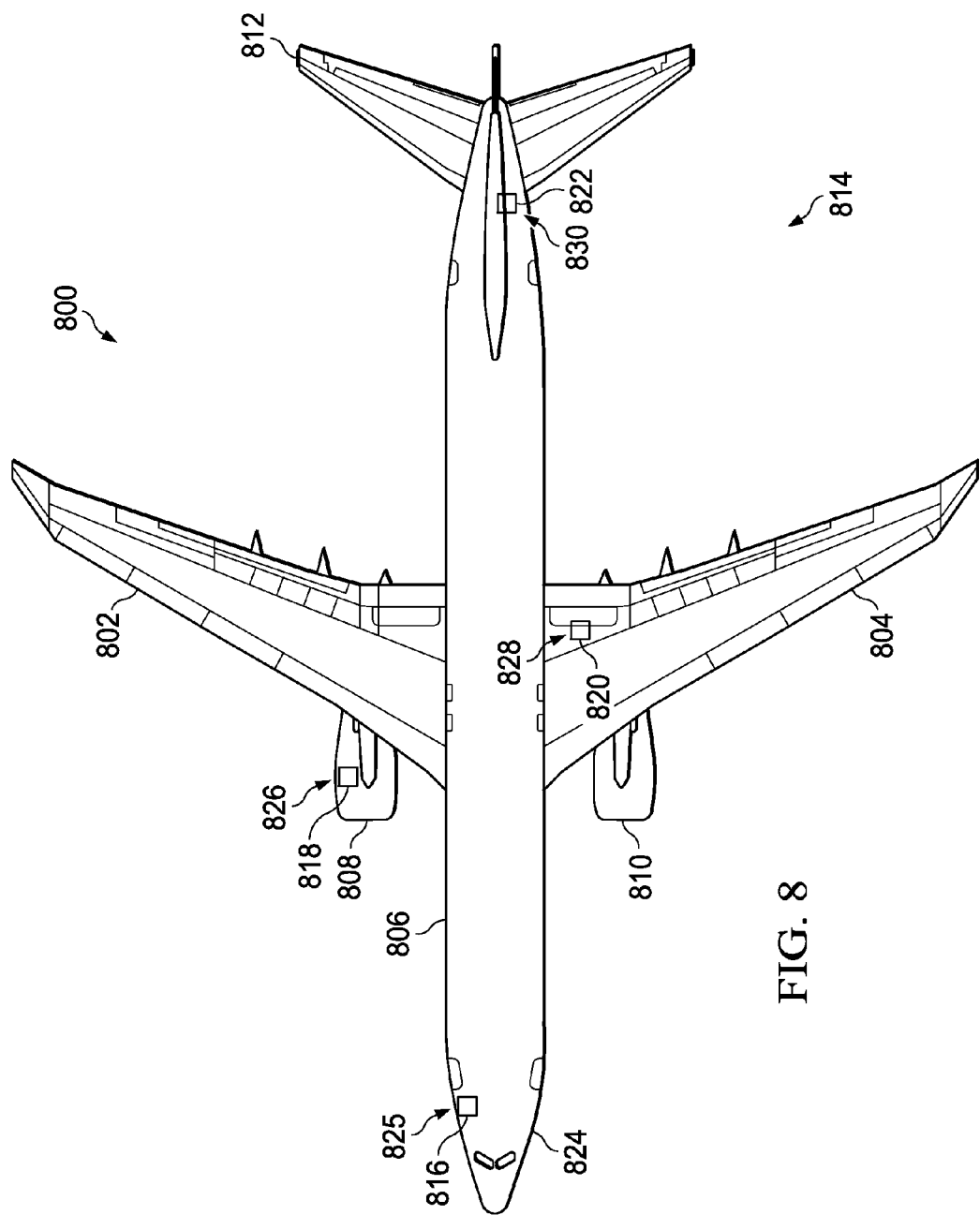
FIG. 8 is an illustration of an aircraft in accordance with an advantageous embodiment.

With reference now to FIG. 8, an illustration of an aircraft is depicted in which an advantageous embodiment may be implemented. In this depicted example, aircraft 800 has wing 802 and wing 804 attached to fuselage 806. Aircraft 800 also includes engine 808, engine 810, and tail 812.

In these illustrative examples, aircraft 800 is an example of an implementation of aircraft 202 shown in block form in FIG. 2. As depicted, aircraft location system 814 may be implemented using aircraft location system 300 in FIG. 3. In this illustrative example, aircraft location system 814 may comprise signal generator 816, signal generator 818, signal generator 820, and signal generator 822. As can be seen, signal generator 816 is in location 825 towards nose 824 of aircraft 800. Signal generator 818 is in location 826 in engine 808. Signal generator 820 is in location 828 in wing 804. Signal generator 822 is in location 830 in tail 812.

The illustration of locations for signal generators in FIG. 8 is not meant to imply limitations to the locations at which signal generators may be placed or the number of signal generators that may be used for an aircraft. For example, other aircraft may have additional signal generators in addition to and/or in place of the ones illustrated in FIG. 8. These signal generators may be located on a horizontal stabilizer, a vertical stabilizer, on a door, in a luggage bin in the aircraft, on the floor in the aircraft, recessed into the floor of the aircraft, and in other suitable locations.

Figure 9:
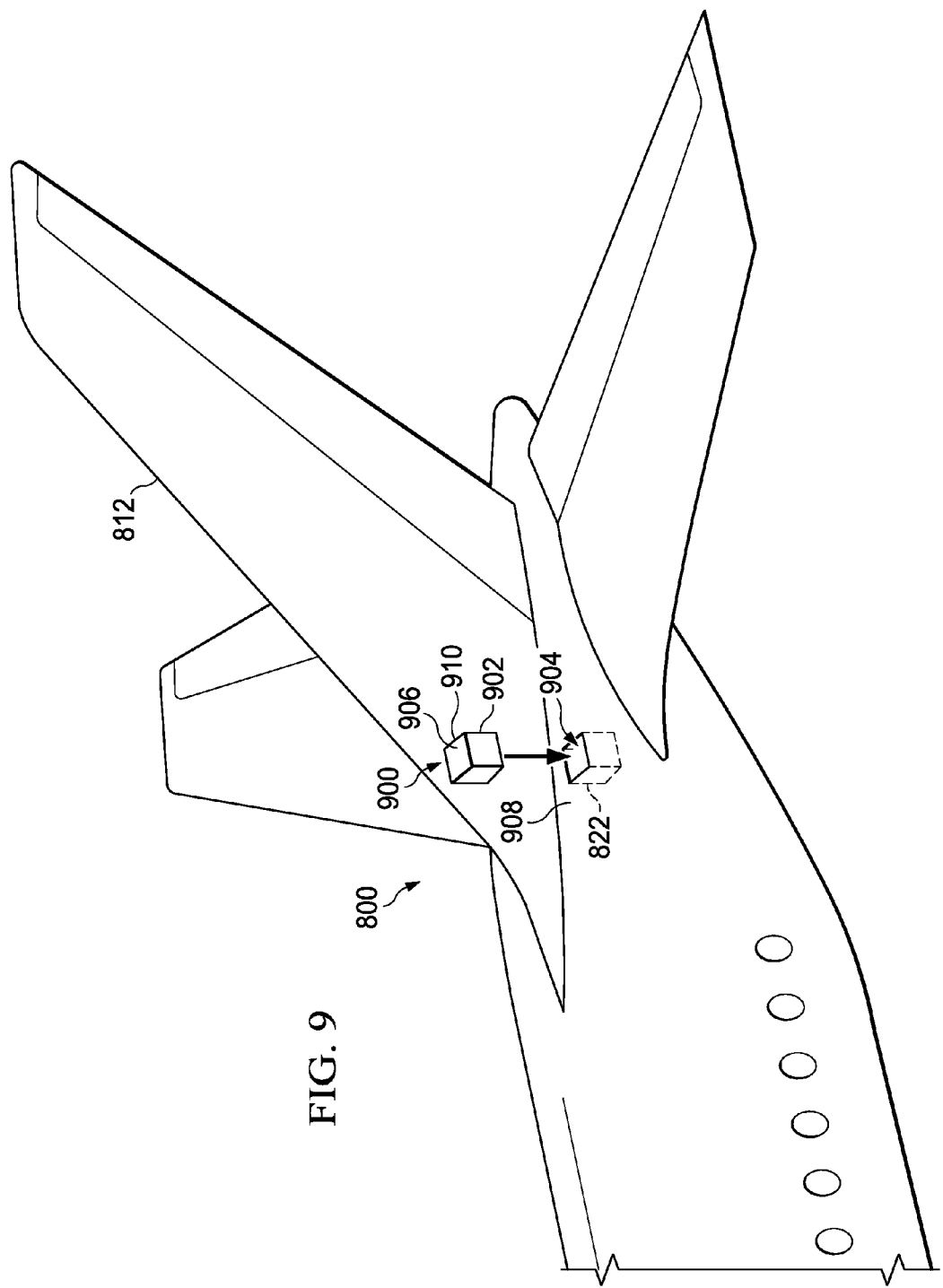
FIG. 9 is an illustration of a portion of an aircraft in accordance with an advantageous embodiment.

With reference now to FIG. 9, an illustration of a portion of aircraft 800 is depicted in accordance with an advantageous embodiment. In this illustrative example, tail 812 is seen in a more-detailed view. As illustrated, signal generator 822 takes the form of module 902. In these illustrative examples, module 902 is an example of an implementation for module 446 shown in block form in FIG. 4.

As depicted, aircraft structure 900 for module 902 may be placed into cavity 904 in tail 812. When placed inside cavity 904, surface 906 may be substantially flush or smooth with respect to surface 908 of tail 812. In these illustrative examples, one or more signal generators may be present in module 902.

In some illustrative examples, surface 906 may form part of the surface for tail 812. In this illustrative example, moveable structure 910 on surface 906 may cover an opening (not shown) in module 902.

Figure 10:
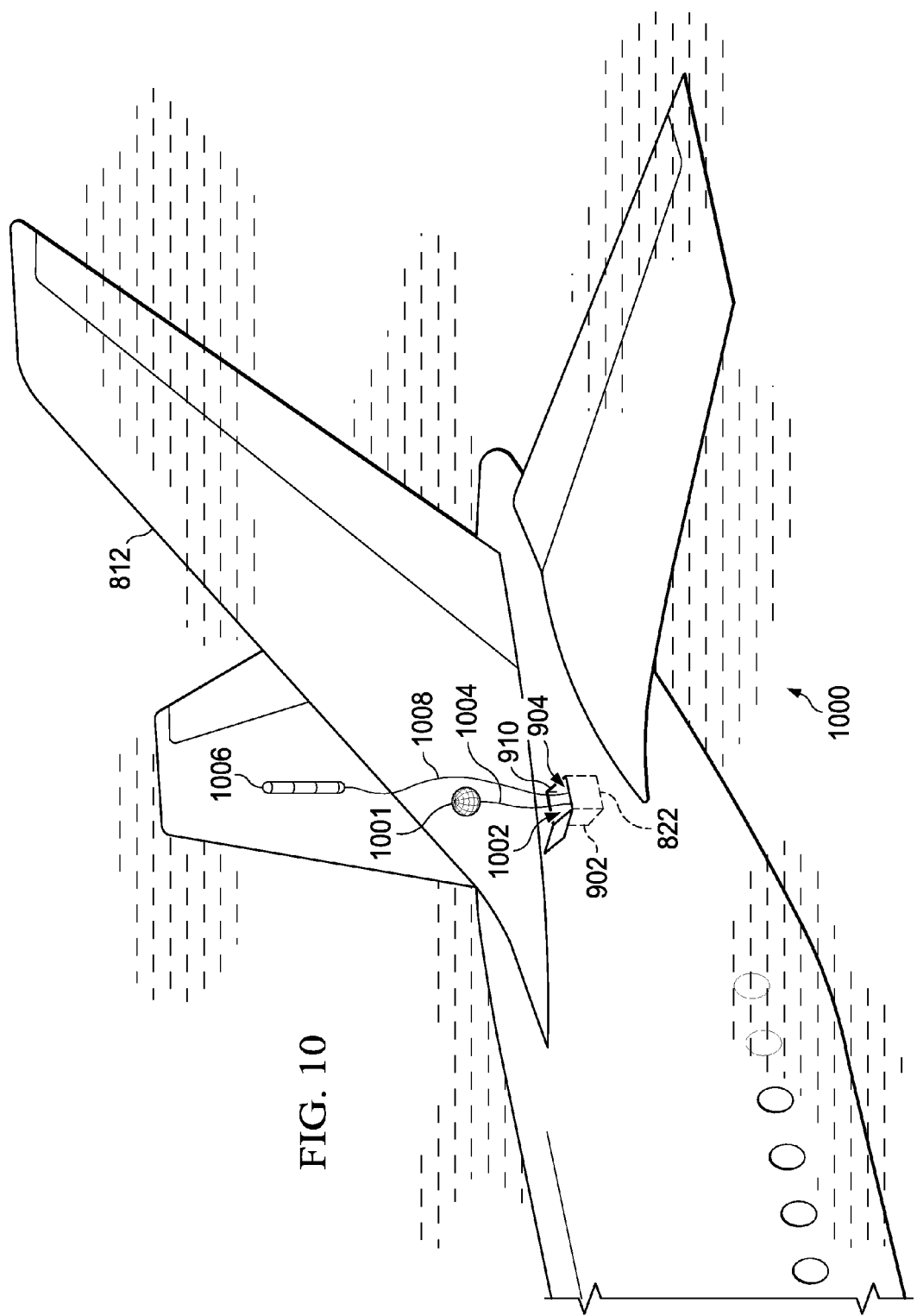
FIG. 10 is a more-detailed illustration of a signal generator in accordance with an advantageous embodiment.

With reference now to FIG. 10, a more-detailed illustration of a signal generator is depicted in accordance with an advantageous embodiment. In this illustrative example, a more-detailed view of tail 812 with module 902 installed into cavity 904 and in a deployed configuration in water environment 1000 is seen from a perspective view.

In this illustrative example, signal generator 822 is shown in a deployed configuration. In this configuration, moveable structure 910 has moved to allow acoustic reflector 1001 to leave cavity 1002 into water environment 1000. Acoustic reflector 1001 may be connected to module 902 by tether 1004, which is part of a retention system in these illustrative examples. Moveable structure 910 also is part of the retention system.

Further, module 902 also includes radio frequency signal generator 1006. Radio frequency signal generator 1006 may include a flotation system that allows radio frequency signal generator 1006 to leave cavity 1002 into water environment 1000. In this illustrative example, the retention system for radio frequency signal generator 1006 comprises tether 1008. As illustrated, radio frequency signal generator 1006 also is shown in a deployed configuration outside of module 902.

In some illustrative examples, both acoustic reflector 1001 and radio frequency signal generator 1006 may be located within different cavities in module 902, such as cavity 1002.

As depicted, moveable structure 910 may move to an open position when a selected amount of pressure is detected. The pressure may be selected for a particular depth in water when deployment of acoustic reflector 1001 and radio frequency signal generator 1006 should occur.

Figure 11:
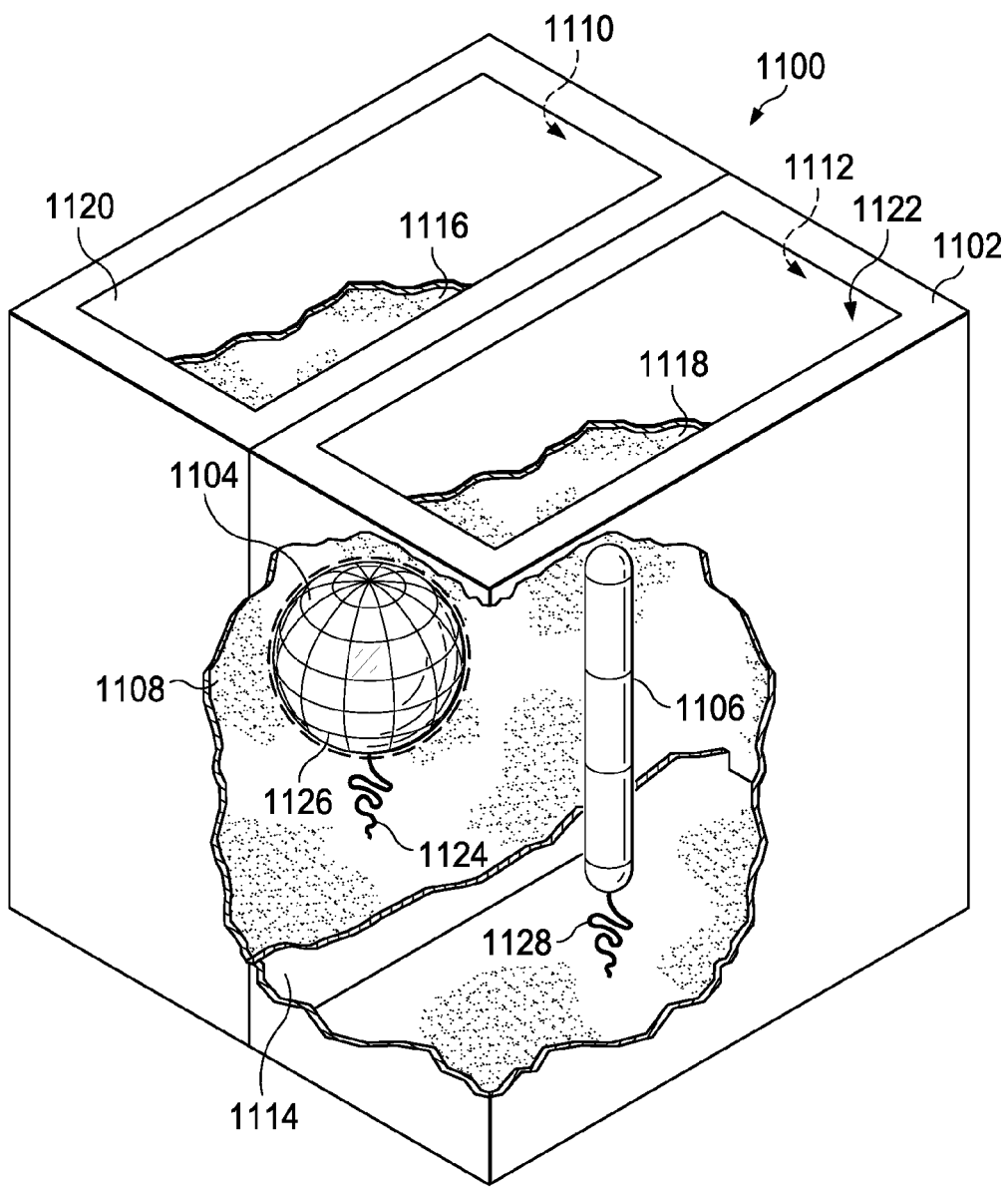
FIG. 11 is an illustration of a module in accordance with an advantageous embodiment.

With reference now to FIG. 11, an illustration of a module is depicted in accordance with an advantageous embodiment. In this illustrative example, an exposed view of module 1100 is depicted. In this illustrative example, module 1100 is an example of an implementation of module 446 in FIG. 4. In particular, module 1100 is an example of one implementation for module 902 in FIG. 9. Module 1100 is illustrated in an undeployed configuration. Module 1100 may be implemented in different locations of an aircraft, such as one of locations 825, 826, 828, and 830 for aircraft 800 in FIG. 8.

In this illustrative example, module 1100 comprises aircraft structure 1102, acoustic reflector 1104, radio frequency signal generator 1106, and foam 1108. In this illustrative example, acoustic reflector 1104 is located in cavity 1110. Radio frequency signal generator 1106 is located in cavity 1112. Cavity 1110 is separated from cavity 1112 in aircraft structure 1102 by wall 1114.

Aircraft structure 1102 has opening 1116 to cavity 1110 and opening 1118 to cavity 1112. Moveable structure 1120 covers opening 1116. Moveable structure 1122 covers opening 1118. Tether 1124, net 1126, and tether 1128 form a retention system for acoustic reflector 1104 and radio frequency signal generator 1106. Net 1126 holds acoustic reflector 1104. Tether 1124 connects net 1126 to aircraft structure 1102. Tether 1128 connects radio frequency signal generator 1106 to aircraft structure 1102.

Foam 1108 is located in cavity 1110 and cavity 1112. Foam 1108 is a survivability system for both acoustic reflector 1104 and radio frequency signal generator 1106. Foam 1108 is configured to protect these components from forces that may be encountered in response to an unintended encounter with a water environment.

Figure 12:
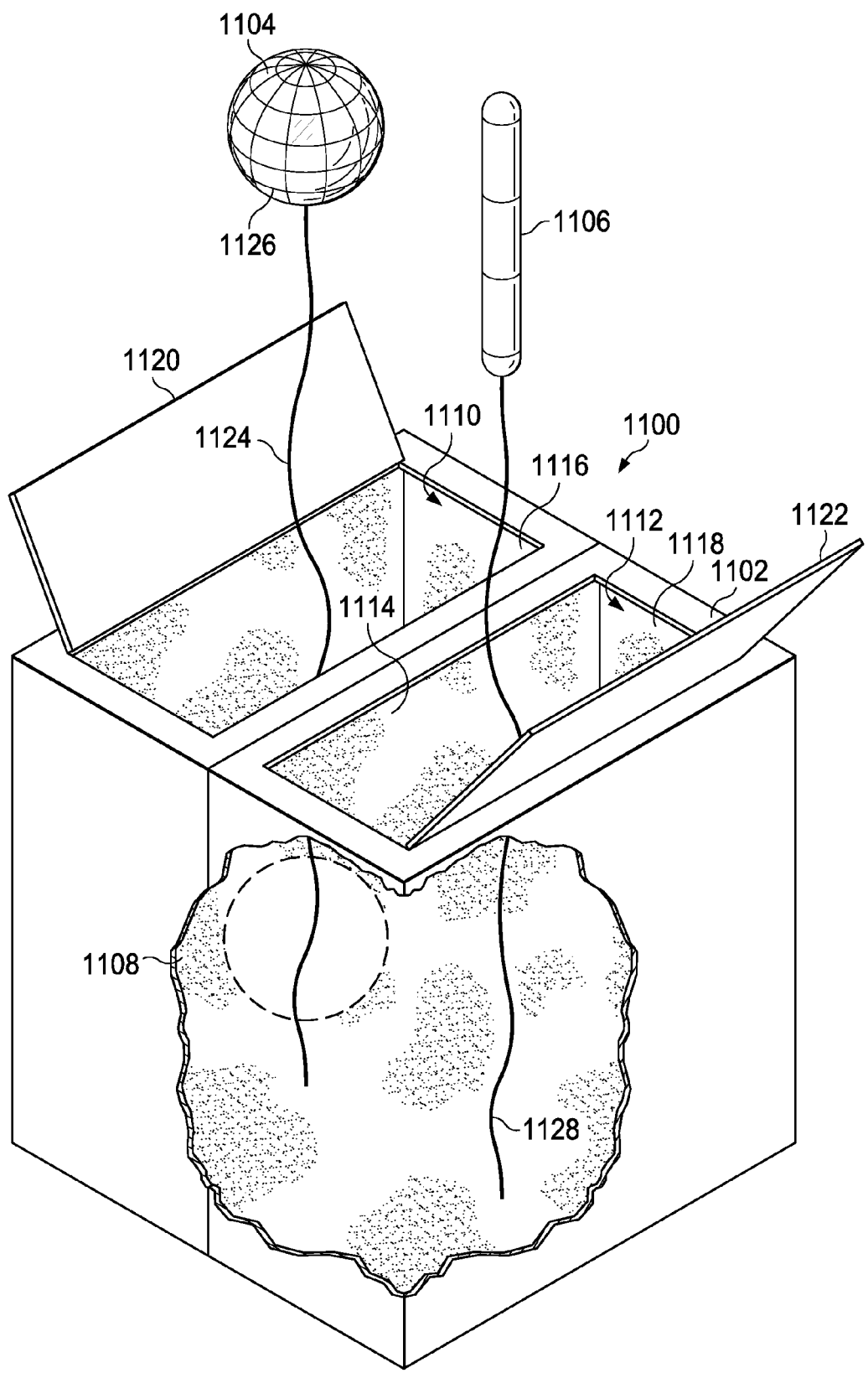
FIG. 12 is an illustration of a module in a deployed configuration in accordance with an advantageous embodiment.

Turning now to FIG. 12, an illustration of a module in a deployed configuration is depicted in accordance with an advantageous embodiment. In this illustrative example, moveable structure 1120 and moveable structure 1122 have moved to expose opening 1116 and opening 1118, respectively. Acoustic reflector 1104 has moved to a location outside of aircraft structure 1102. Additionally, radio frequency signal generator 1106 also has moved outside of aircraft structure 1102.

In these illustrative examples, moveable structure 1120 and moveable structure 1122 may move at different times. For example, moveable structure 1120 may be configured to move when a selected pressure on aircraft structure 1102 is reached. Moveable structure 1122 may be configured to move when some period of time passes after a selected pressure is reached.

Figure 13:
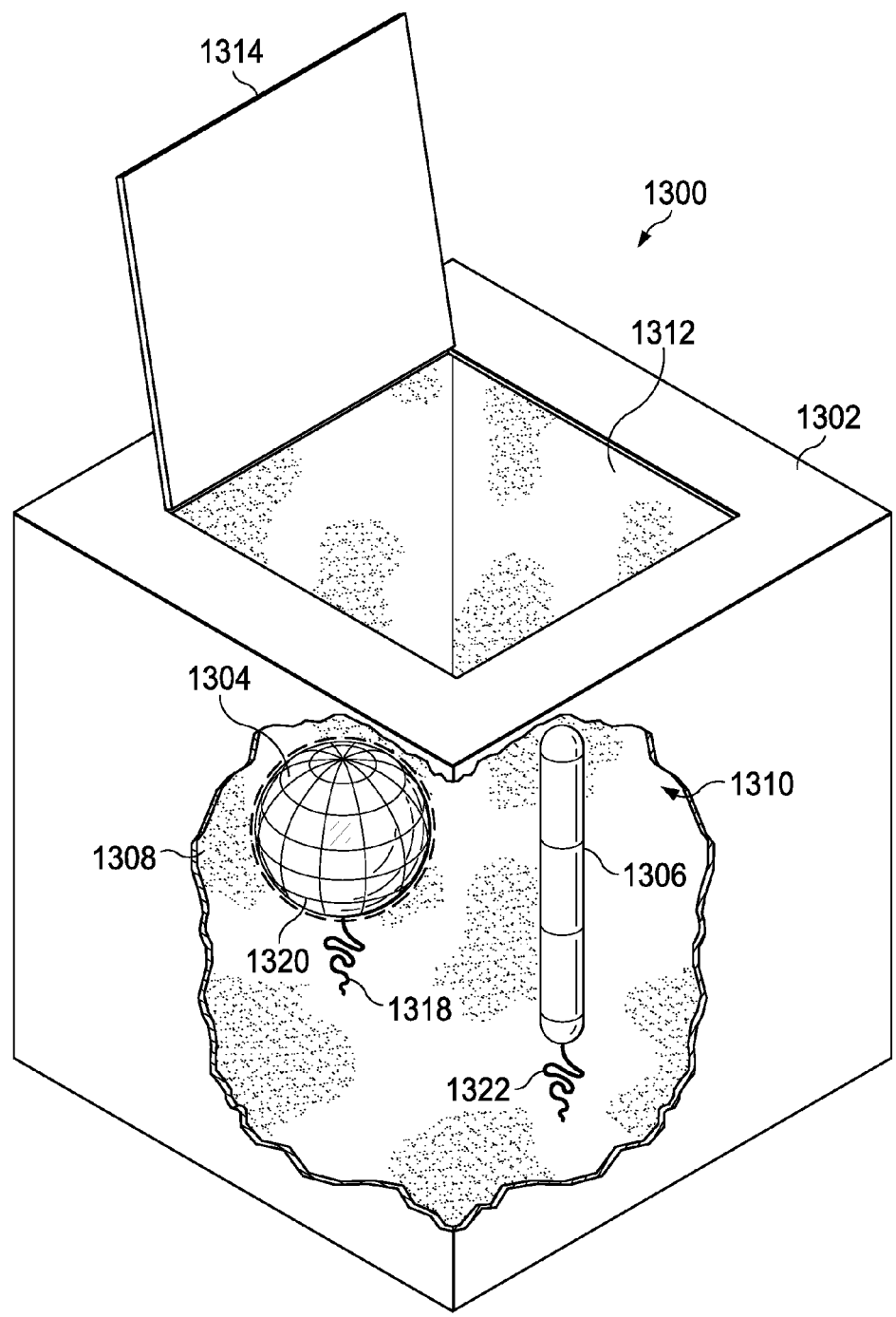
FIG. 13 is an illustration of a module in accordance with an advantageous embodiment.

With reference now to FIG. 13, an illustration of a module is depicted in accordance with an advantageous embodiment. In this illustrative example, an exposed view of module 1300 is depicted. In this illustrative example, module 1300 is an example of an implementation of module 446 in FIG. 4. In particular, module 1300 is an example of another implementation for module 902 in FIG. 9. Module 1300 is illustrated in an undeployed configuration. Module 1300 may be implemented in different locations of an aircraft, such as one of locations 825, 826, 828, and 830 for aircraft 800 in FIG. 8.

In this illustrative example, module 1300 comprises aircraft structure 1302, acoustic reflector 1304, radio frequency signal generator 1306, and foam 1308. In this illustrative example, acoustic reflector 1304 and radio frequency signal generator 1306 are both located in cavity 1310.

Aircraft structure 1302 has opening 1312 to cavity 1310. Moveable structure 1314 covers opening 1312. Tether 1318, net 1320, and tether 1322 form a retention system for acoustic reflector 1304 and radio frequency signal generator 1306. Net 1320 holds acoustic reflector 1304. Tether 1318 connects net 1320 to aircraft structure 1302. Tether 1322 connects radio frequency signal generator 1306 to aircraft structure 1302.

Foam 1308 is located in cavity 1310. Foam 1308 is a survivability system for acoustic reflector 1304 and radio frequency signal generator 1306.

Figure 14:
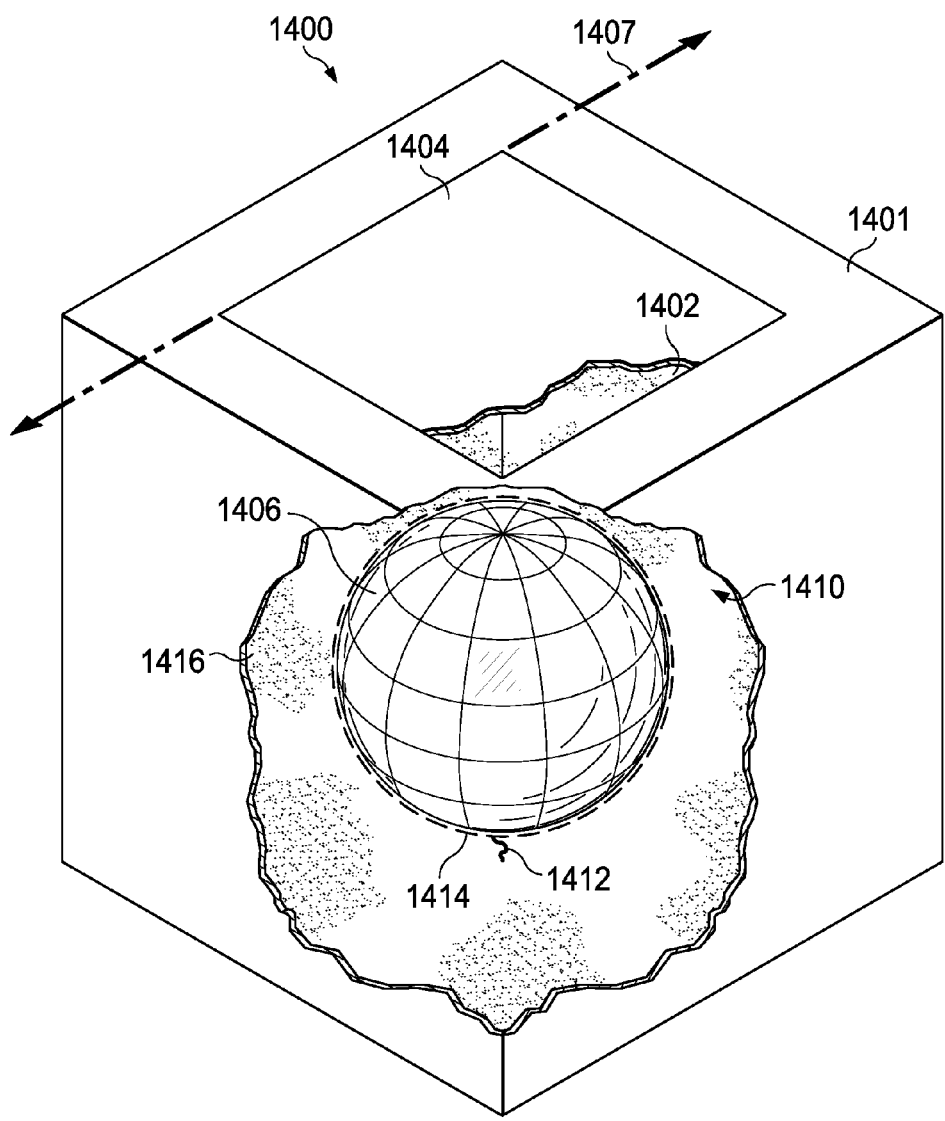
FIG. 14 is an illustration of a module in an undeployed configuration in accordance with an advantageous embodiment.

With reference now to FIG. 14, an illustration of a module in an undeployed configuration is depicted in accordance with an advantageous embodiment. In this illustrative example, an exposed view of module 1400 is depicted. In this illustrative example, module 1400 is an example of an implementation of module 446 in FIG. 4. Module 1400 may be implemented in different locations of an aircraft, such as one of locations 825, 826, 828, and 830 for aircraft 800 in FIG. 8.

Module 1400 is depicted in an undeployed configuration. In this illustrative example, aircraft structure 1401 for module 1400 may have opening 1402 with moveable structure 1404. Moveable structure 1404 may move to expose opening 1402 such that acoustic reflector 1406 may exit module 1400 through opening 1402 in aircraft structure 1401. In this illustrative example, moveable structure 1404 may rotate about axis 1407. In other illustrative examples, moveable structure 1404 may become detached from module 1400. As illustrated in this exposed view, acoustic reflector 1406 is located in cavity 1410 inside of aircraft structure 1401.

When moveable structure 1404 is moved to expose opening 1402, acoustic reflector 1406 may move through opening 1402 outside of aircraft structure 1401. As illustrated, acoustic reflector 1406 may be connected to module 1400 using tether 1412 and mesh 1414. These components are a part of a retention system for acoustic reflector 1406.

Mesh 1414 may hold acoustic reflector 1406. Tether 1412 may connect mesh 1414 to aircraft structure 1401 for module 1400. In this manner, acoustic reflector 1406 may float out of module 1400 but may be retained within a desired distance using tether 1412.

In this illustrative example, module 1400 also may include a survivability system in the form of foam 1416. Foam 1416 is located inside of cavity 1410 and may provide protection for acoustic reflector 1406 from a force occurring from an unintended encounter with a water environment.

Figure 15:
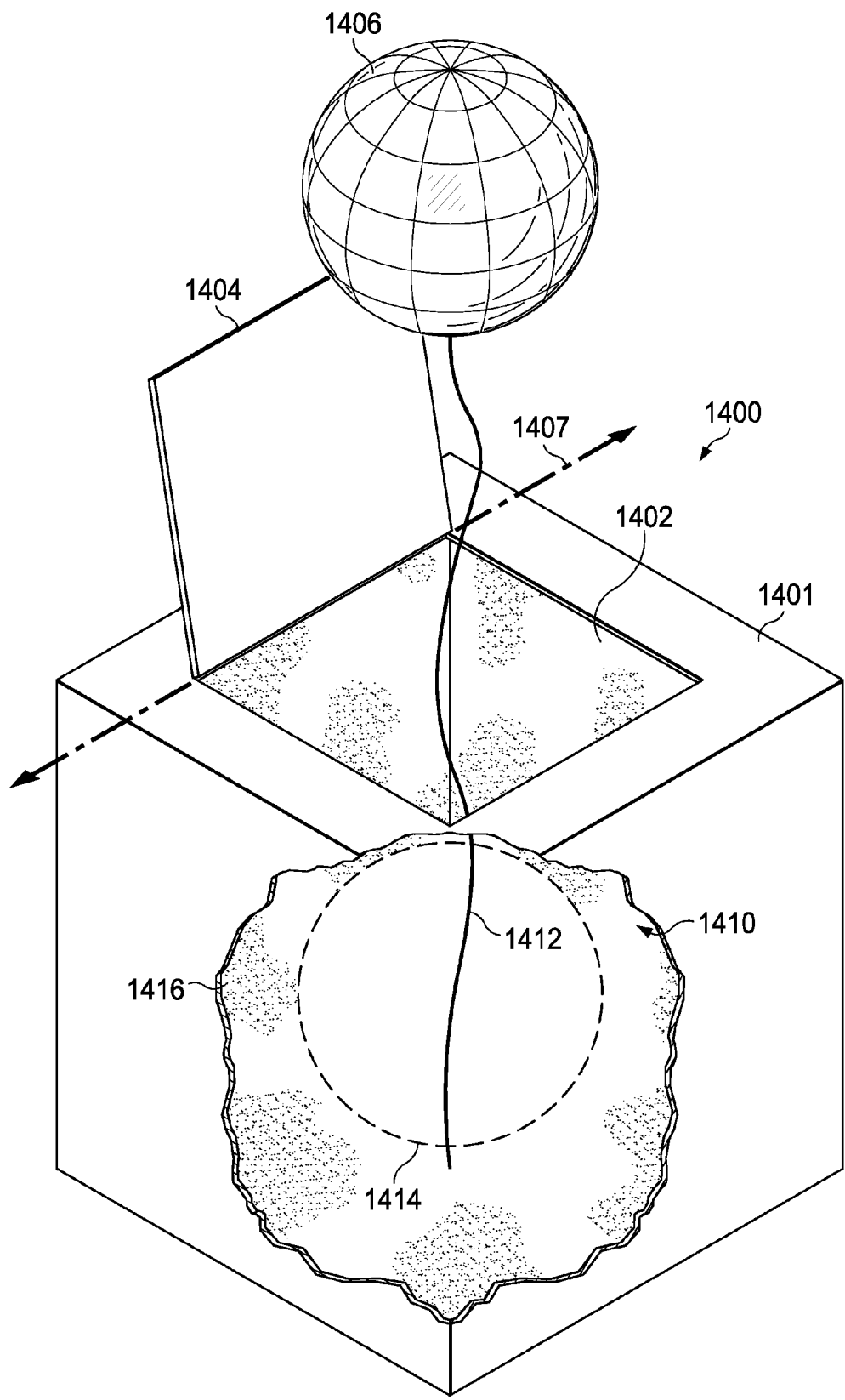
FIG. 15 is an illustration of a module in a deployed configuration in accordance with an advantageous embodiment.

In reference now to FIG. 15, an illustration of a module in a deployed configuration is depicted in accordance with an advantageous embodiment. In this illustrative example, module 1400 is shown in a deployed configuration. In this deployed configuration, acoustic reflector 1406 is shown outside of aircraft structure 1401.

Figure 16:
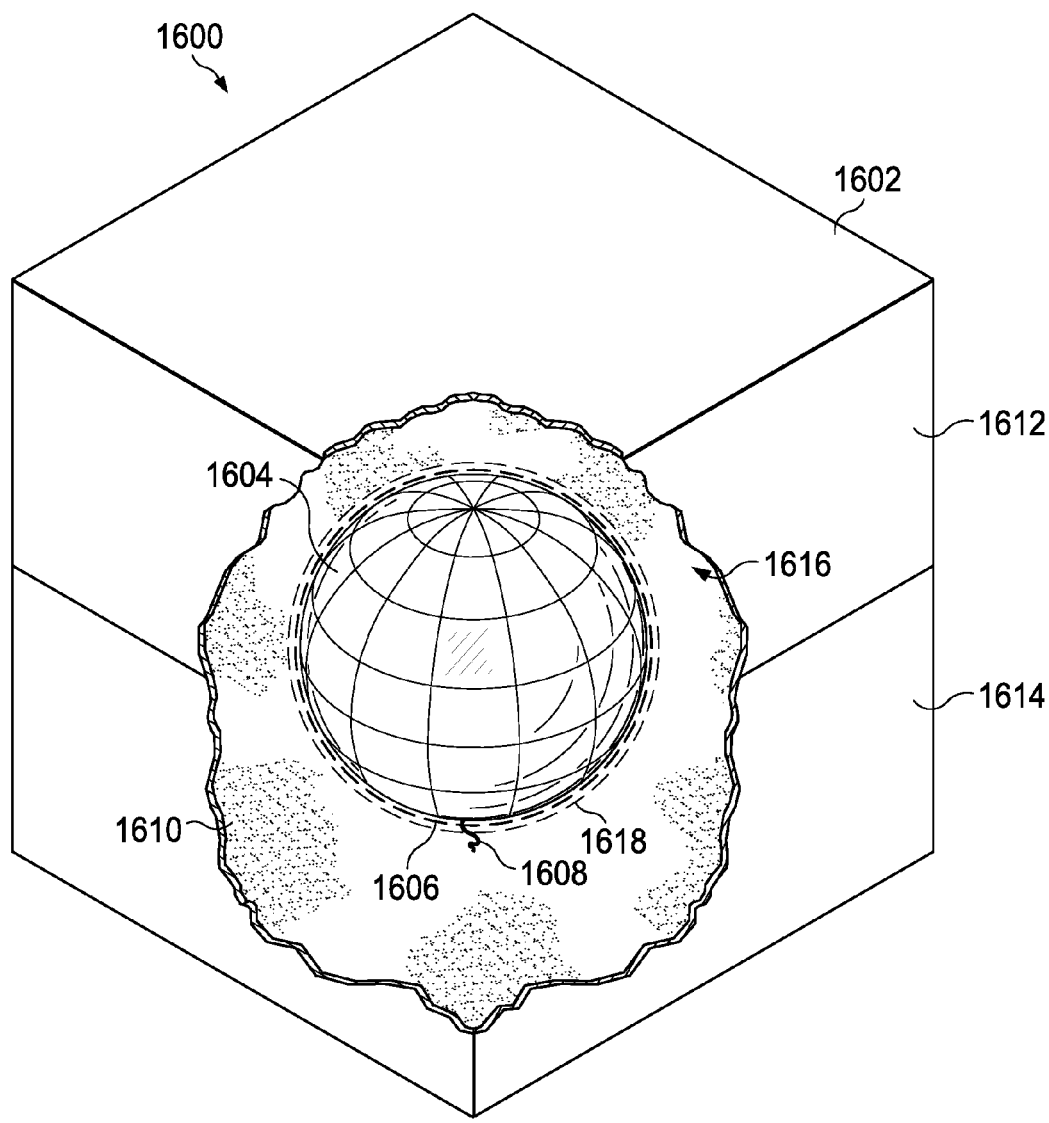
FIG. 16 is an illustration of a module in an undeployed configuration in accordance with an advantageous embodiment.

Turning now to FIG. 16, an illustration of a module in an undeployed configuration is depicted in accordance with an advantageous embodiment. An exposed view of module 1600 is depicted in FIG. 16. In this illustrative example, module 1600 is an example of an implementation of module 446 in FIG. 4. Module 1600 is illustrated in an undeployed configuration. Module 1600 may be implemented in different locations of an aircraft, such as one of locations 825, 826, 828, and 830 for aircraft 800 in FIG. 8.

In this illustrative example, module 1600 comprises aircraft structure 1602, acoustic reflector 1604, mesh 1606, tether 1608, and foam 1610. In this illustrative example, aircraft structure 1602 may be comprised of two sections, section 1612 and section 1614. These sections may become separated when acoustic reflector 1604 in module 1600 is to be deployed.

Foam 1610 fills cavity 1616 inside of aircraft structure 1602. Foam 1610 is part of a survivability system for acoustic reflector 1604. As depicted, foam 1610 includes volume 1618 in which acoustic reflector 1604 is located. Foam 1610 may be selected from a material that is configured to reduce forces that may be applied to acoustic reflector 1604.

Mesh 1606 may encompass acoustic reflector 1604. Tether 1608 connects mesh 1606 to section 1614 of aircraft structure 1602.

Figure 17:
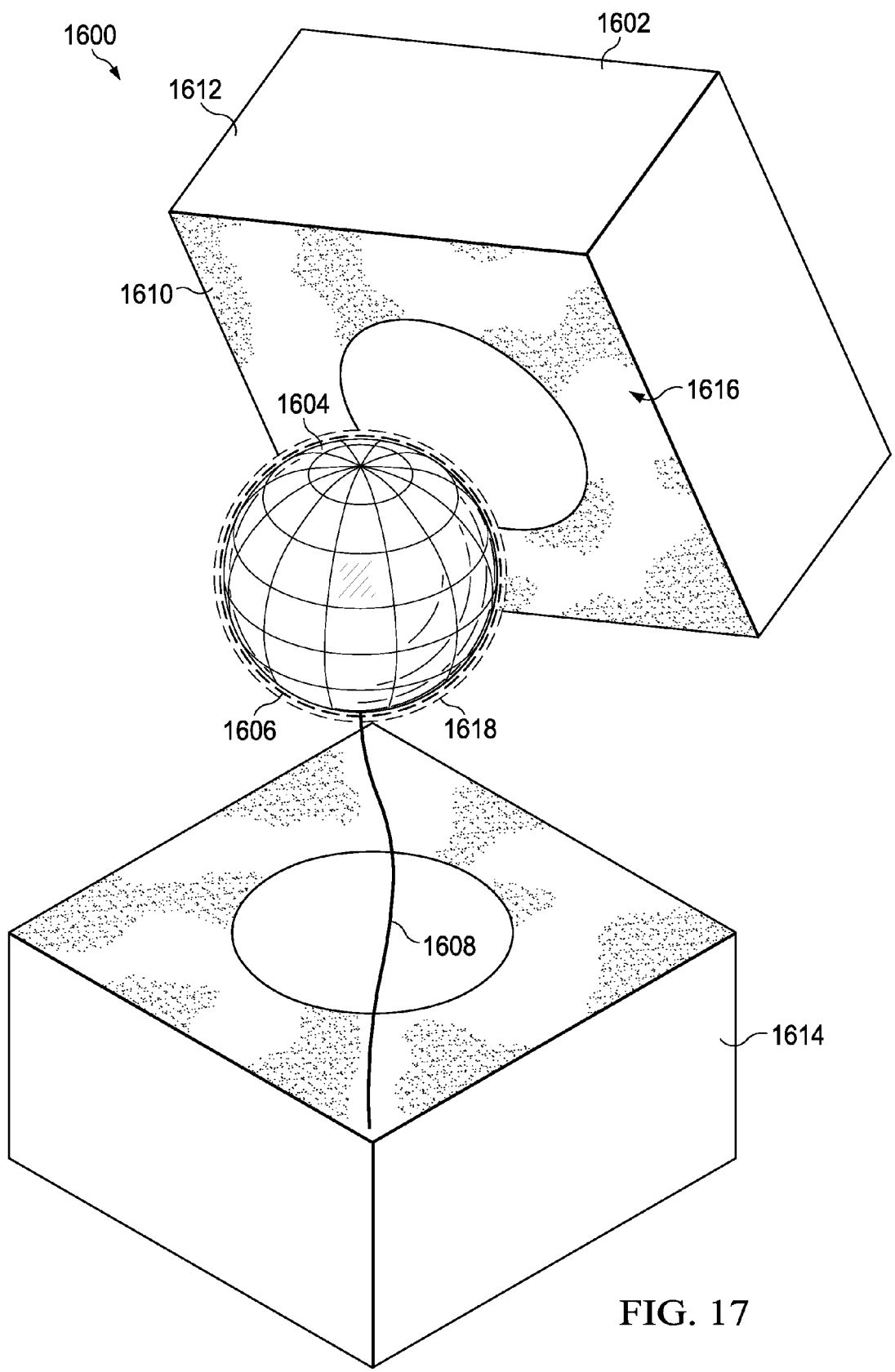
FIG. 17 is an illustration of a module in a deployed configuration in accordance with an advantageous embodiment.

With reference now to FIG. 17, an illustration of a module in a deployed configuration is depicted in accordance with an advantageous embodiment. In this depicted example, section 1614 and section 1612 of aircraft structure 1602 have become separated from each other. Acoustic reflector 1604 may float upward. Acoustic reflector 1604 may remain within a selected distance from section 1614 through tether 1608.

Figure 18:
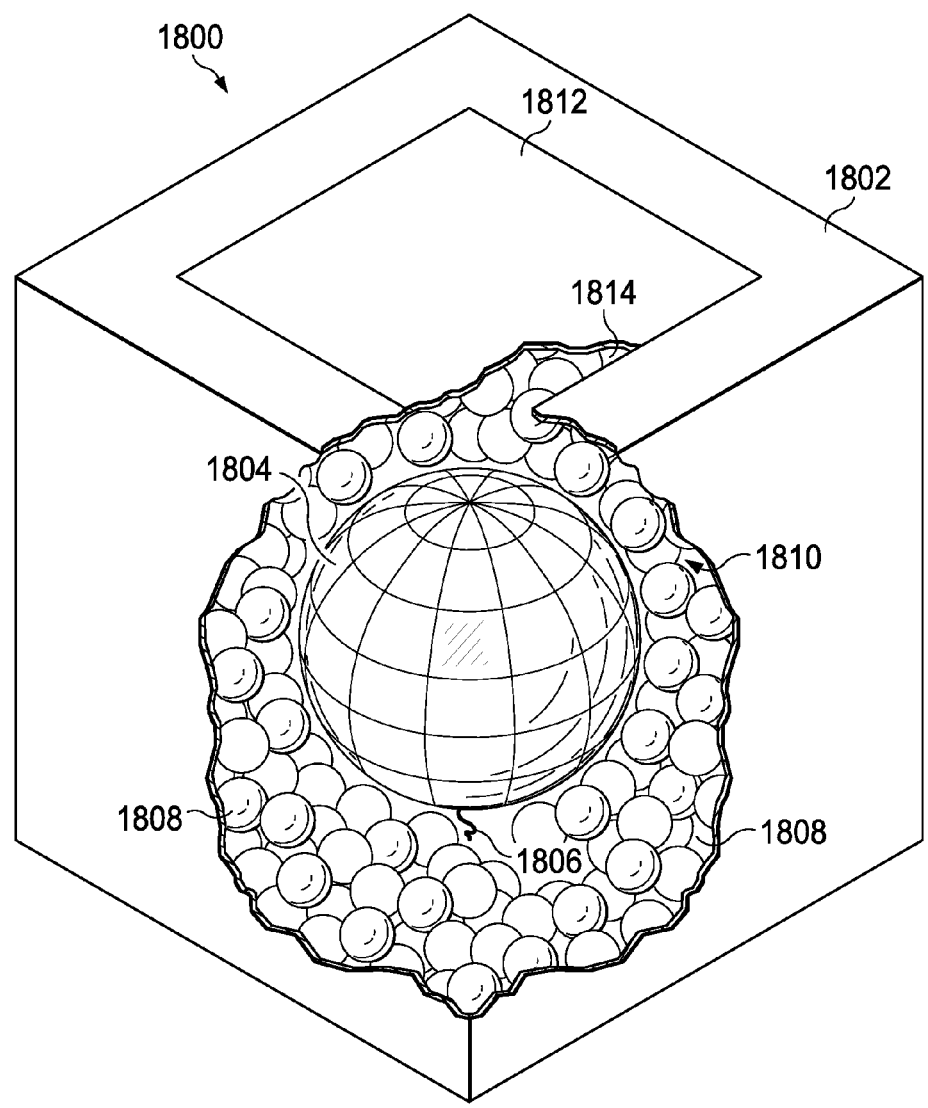
FIG. 18 is an illustration of a module in accordance with an advantageous embodiment.

With reference now to FIG. 18, an illustration of a module is depicted in accordance with an advantageous embodiment. In this illustrative example, an exposed view of module 1800 is depicted. In this illustrative example, module 1800 is an example of an implementation of module 446 in FIG. 4. Module 1800 is illustrated in an undeployed configuration. Module 1800 may be implemented in different locations of an aircraft, such as one of locations 825, 826, 828, and 830 for aircraft 800 in FIG. 8.

Module 1800 comprises aircraft structure 1802, acoustic reflector 1804, tether 1806, and packing elements 1808. Packing elements 1808 may be, for example, at least one of polyurethane air-filled pouches, polyurethane gel-filled pouches, industrial packing material, and other suitable types of packing elements. The packing elements may be selected based on an ability to reduce force that is applied to acoustic reflector 1804 from an unintended encounter with a water environment. Packing elements 1808 may be selected such that acoustic reflector 1804 may operate after an unintended encounter with a water environment occurs.

Acoustic reflector 1804 is located in cavity 1810 in aircraft structure 1802. Moveable structure 1812 covers opening 1814 in aircraft structure 1802. Moveable structure 1812 may be moved to expose opening 1814 to allow acoustic reflector 1804 to move out of aircraft structure 1802.

Packing elements 1808 also are located inside of cavity 1810. Packing elements 1808 may take the form of beads or spheres. Packing elements 1808 are part of a survivability system for reducing force applied to acoustic reflector 1804. In this illustrative example, tether 1806 is connected to acoustic reflector 1804 and aircraft structure 1802.

Figure 19:
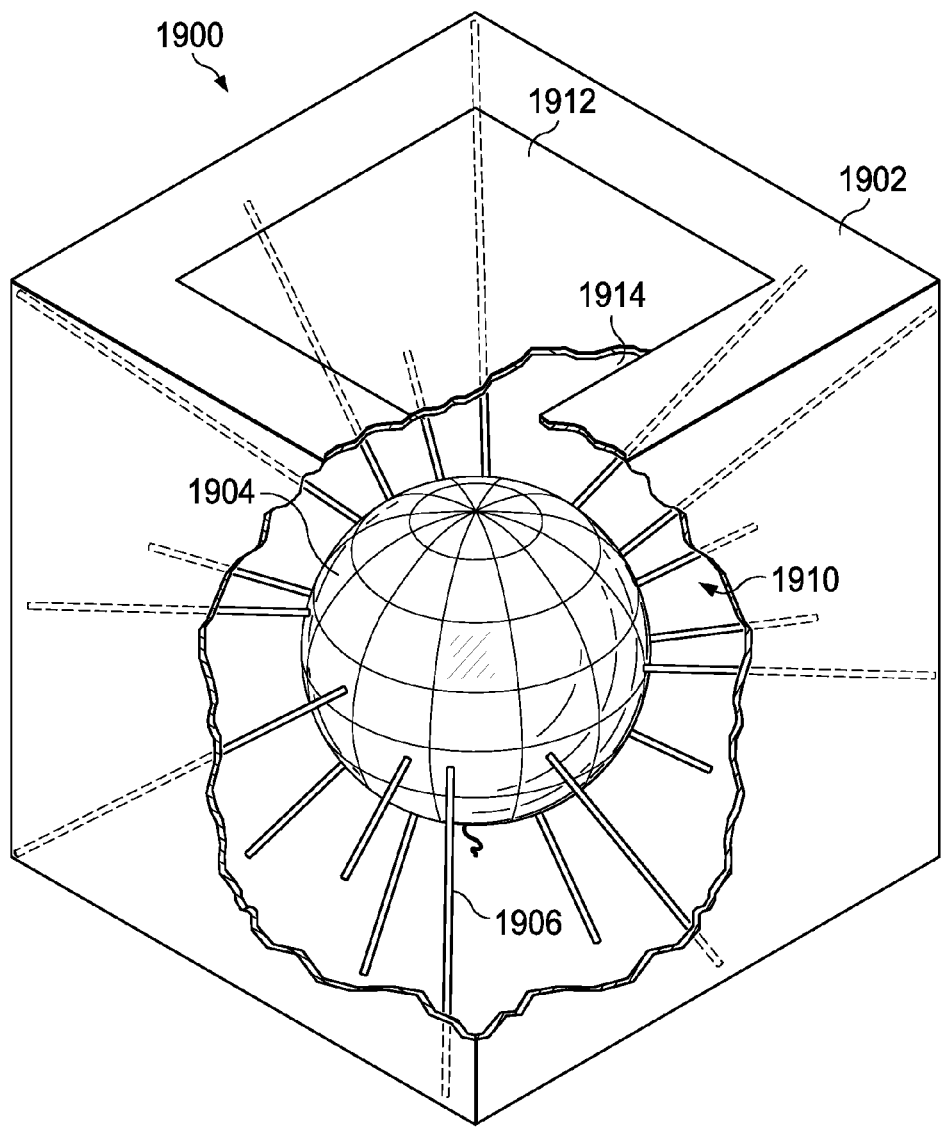
FIG. 19 is an illustration of a module in accordance with an advantageous embodiment.

With reference now to FIG. 19, an illustration of a module is depicted in accordance with an advantageous embodiment. In this illustrative example, an exposed view of module 1900 is depicted. In this illustrative example, module 1900 is an example of an implementation of module 446 in FIG. 4. Module 1900 is illustrated in an undeployed configuration. Module 1900 may be implemented in different locations of an aircraft, such as one of locations 825, 826, 828, and 830 for aircraft 800 in FIG. 8.

In this illustrative example, module 1900 comprises aircraft structure 1902, acoustic reflector 1904, and support members 1906. Acoustic reflector 1904 is located in cavity 1910 in aircraft structure 1902. Moveable structure 1912 covers opening 1914 in aircraft structure 1902. Moveable structure 1912 may be moved to expose opening 1914.

Support members 1906 may support acoustic reflector 1904 inside of cavity 1910. Support members 1906 may be elastic, flexible, or a combination of the two. Support members 1906 may be configured to reduce forces that may be applied to acoustic reflector 1904 when an unintended encounter with a water environment occurs.

In this illustrative example, when moveable structure 1912 moves to expose opening 1914, acoustic reflector 1904 does not move outside of aircraft structure 1902. Acoustic reflector 1904 remains in cavity 1910. When moveable structure 1912 moves to expose opening 1914, however, water moves into cavity 1910. As a result, acoustic reflector 1904 may receive signals and transmit signals in response to receiving signals.

Figure 20:
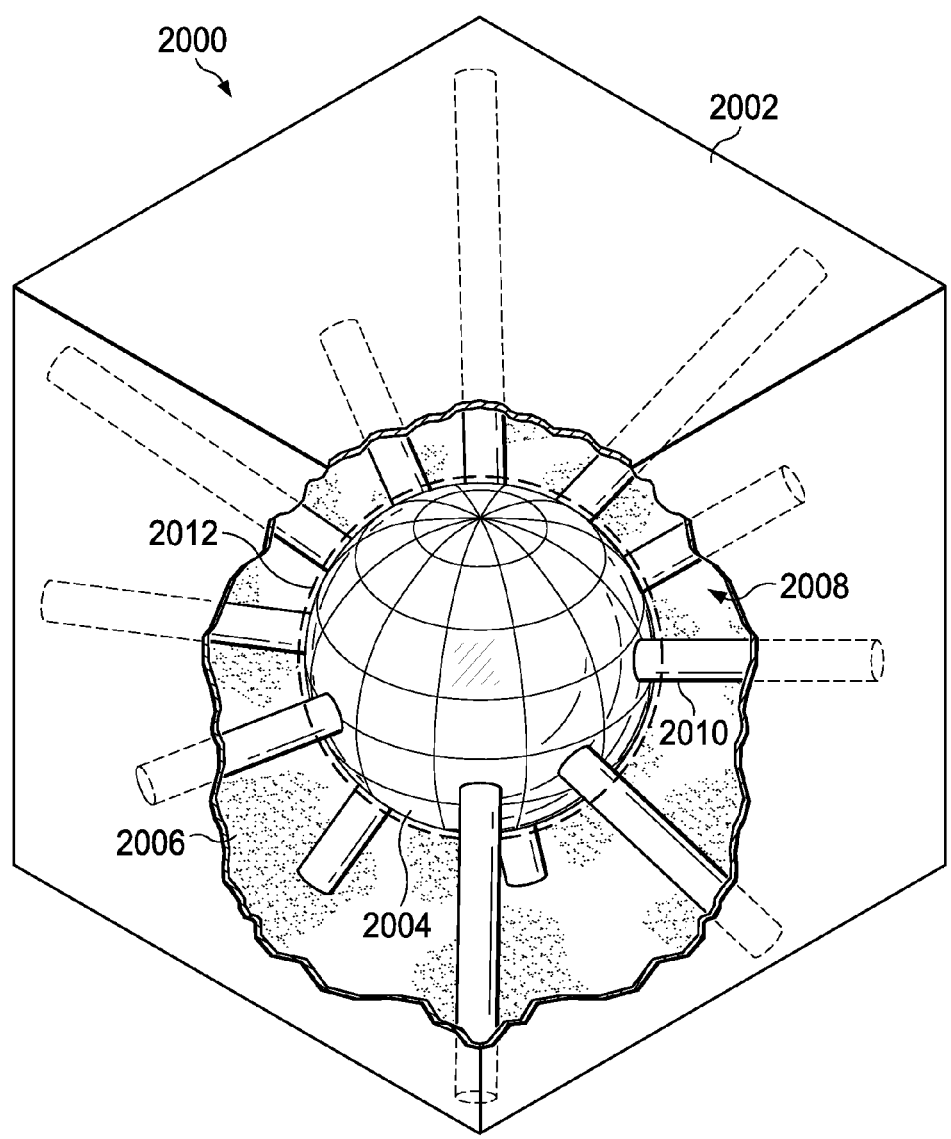
FIG. 20 is an illustration of a module in accordance with an advantageous embodiment.

With reference now to FIG. 20, an illustration of a module is depicted in accordance with an advantageous embodiment. In this illustrative example, an exposed view of module 2000 is depicted. In this illustrative example, module 2000 is an example of an implementation of module 446 in FIG. 4. Module 2000 is illustrated in an undeployed configuration. Module 2000 may be implemented in different locations of an aircraft, such as one of locations 825, 826, 828, and 830 for aircraft 800 in FIG. 8.

In this illustrative example, module 2000 comprises aircraft structure 2002, acoustic reflector 2004, and foam 2006. Acoustic reflector 2004 is located in cavity 2008 in aircraft structure 2002. Channels 2010 are present in aircraft structure 2002. Channels 2010 provide a mechanism to allow water to enter cavity 2008.

Foam 2006 is part of a survivability system for acoustic reflector 2004. Volume 2012 is present within foam 2006. Acoustic reflector 2004 is located inside of volume 2012. Foam 2006 is configured to allow water from channels 2010 to reach volume 2012. In these illustrative examples, foam 2006 is configured to avoid impeding signals from traveling into and out of aircraft structure 2002.

Figure 21:
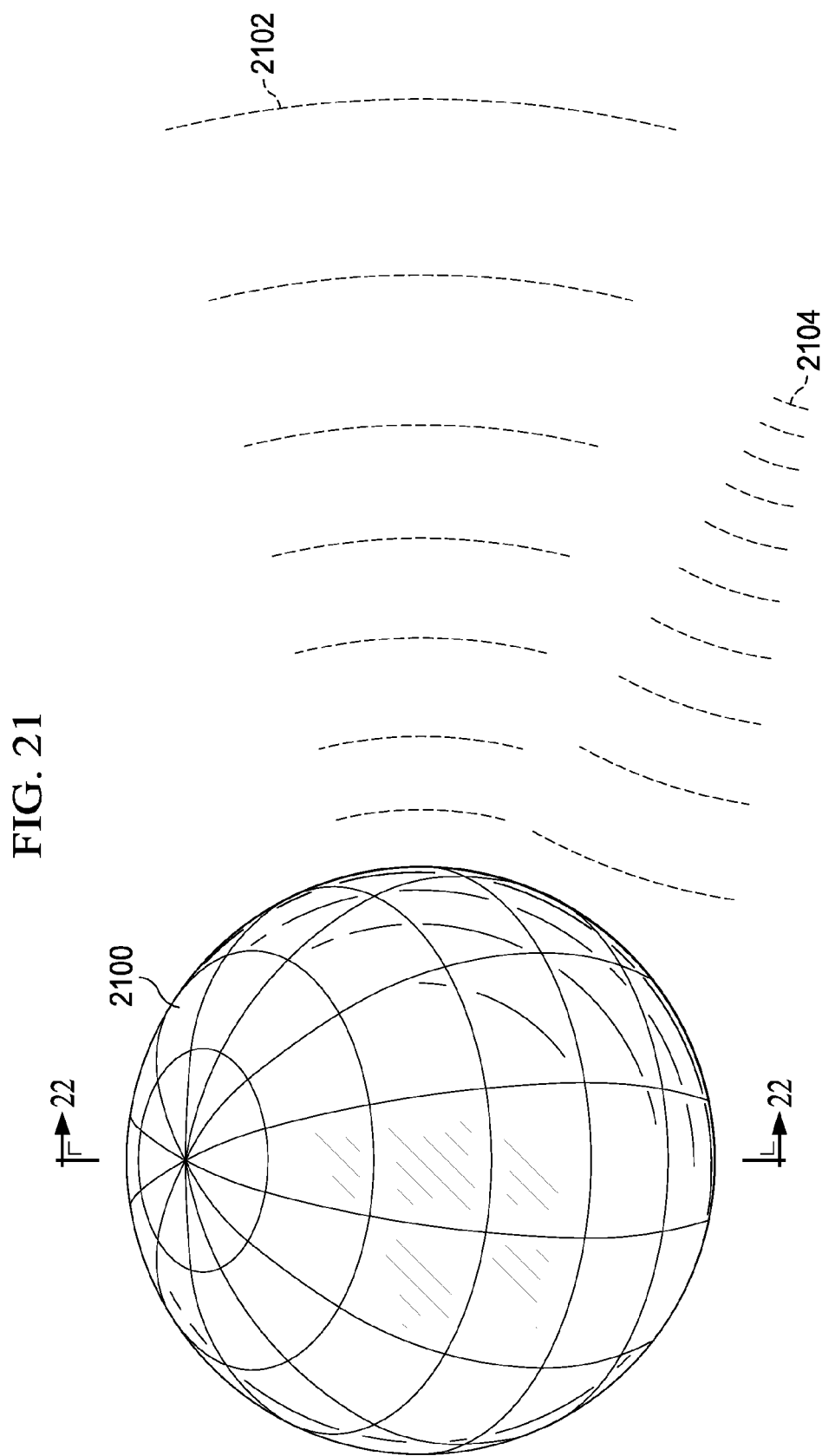
FIG. 21 is an illustration of an acoustic reflector in accordance with an advantageous embodiment.

With reference now to FIG. 21, an illustration of an acoustic reflector is depicted in accordance with an advantageous embodiment. Acoustic reflector 2100 is an example of an acoustic reflector that may be used in a signal generator.

In this illustrative example, acoustic reflector 2100 has the shape of a sphere. In this illustrative example, acoustic reflector 2100 is an example of a passive signal generation device. Acoustic reflector 2100 generates first signals 2102 in response to receiving second signals 2104 in these illustrative examples. These signals take the form of sound waves.

In other words, acoustic reflector 2100 acts as a target that may be used to indicate a location of an aircraft structure with which acoustic reflector 2100 is associated. For example, second signals 2104 may be received from sound location system 240 in FIG. 2. In response, acoustic reflector 2100 generates first signals 2102. These first signals may then be detected by sound location system 240.

Figure 22:
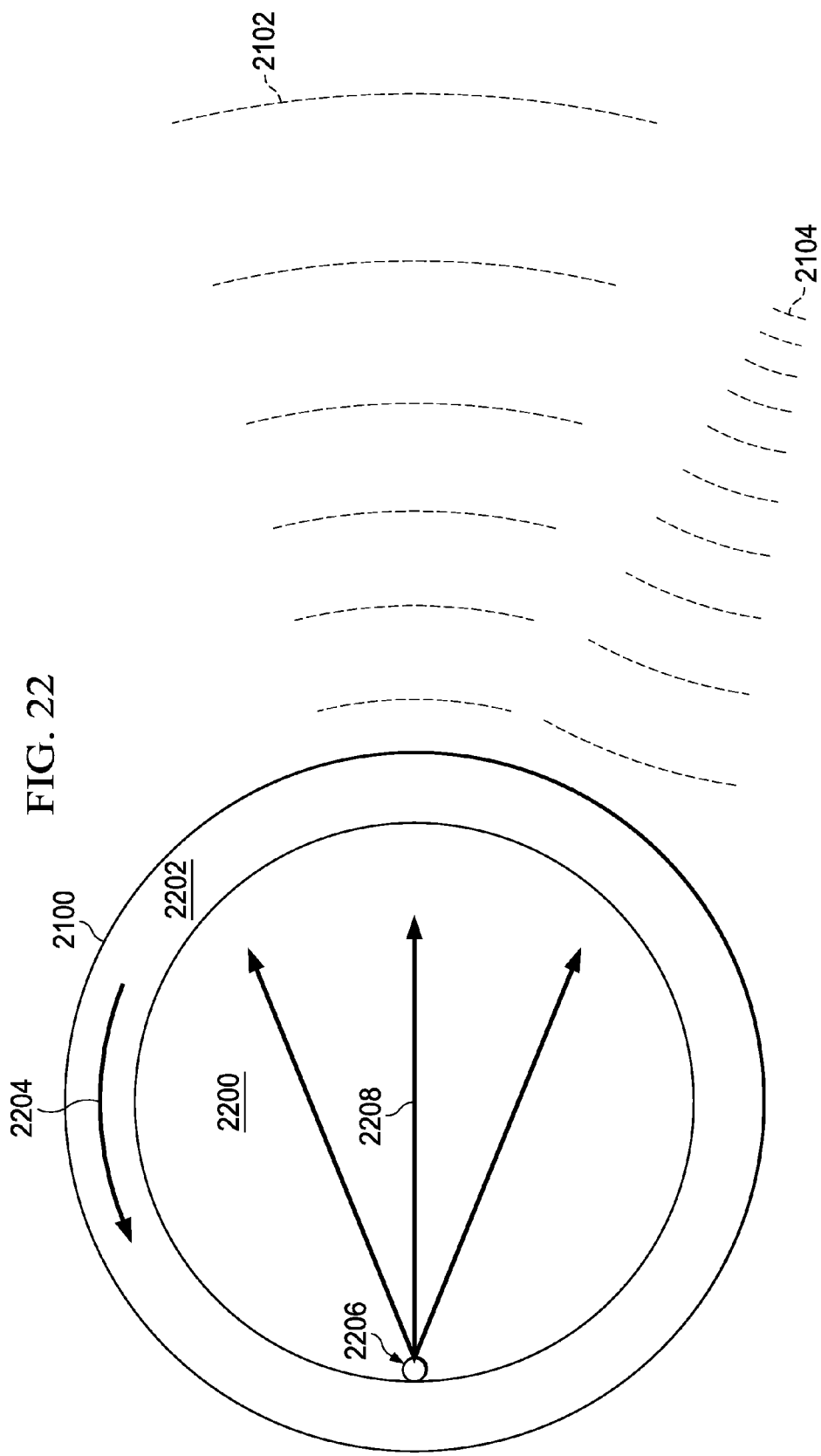
FIG. 22 is an illustration of an acoustic reflector in a cross-sectional view in accordance with an advantageous embodiment.

Turning now to FIG. 22, an illustration of an acoustic reflector in a cross-sectional view is depicted in accordance with an advantageous embodiment. In this illustrative example, acoustic reflector 2100 is seen in a cross-sectional view taken along lines 22-22 in FIG. 21.

In this view, acoustic reflector 2100 has inner section 2200 and outer section 2202. In this illustrative example, inner section 2200 may form a core with outer section 2202 forming a shell around inner section 2200.

In this illustrative example, second signals 2104 may travel as waves in the direction of arrow 2204 in outer section 2202. These waves may converge at location 2206 and may be directed through inner section 2200 in the direction of arrows 2208 for transmission back through outer section 2202 as first signals 2102.

The illustrations of components and configurations in FIGS. 8-22 are not meant to imply limitations to the manner in which different advantageous embodiments may be implemented. The illustrations in these figures are only meant to provide examples of how components shown in block form may be implemented in some embodiments. For example, the different modules in these figures are shown as cubes. Modules may be implemented in other forms. For example, a cuboid, a rhomboid, a cylinder, a pyramid, or some irregular volume may be used. As another example, a radio frequency signal generator may be configured to activate when detecting sounds from an acoustic reflector associated with a different aircraft structure from the radio frequency generator. In still other illustrative examples, a sound generator, a pinger, a light beacon, and/or some other suitable signal generator may be used in placed of or in addition to the radio frequency generator.

As another illustrative example, the tethers in the figures may be attached to a module or other structure with a reel or other mechanism that is configured to control the movement of the acoustic reflector upwards in the water. A reel may take the form of a tension reel that controls the speed at which the acoustic reflector moves upward that reduces a tangling of the tether. In yet another illustrative example, the tether may have a length that is configured to place the acoustic reflector in a location above the debris in the water. This location is selected to increase the exposure that an acoustic reflector may have to signals from search systems. In other words, having a 360 degree field of view for the acoustic reflector is desirable. Also, a flotation system may be attached to the acoustic reflector and/or tether to generate positive buoyancy for the acoustic reflector such that the acoustic reflector will float upwards.

Figure 23:
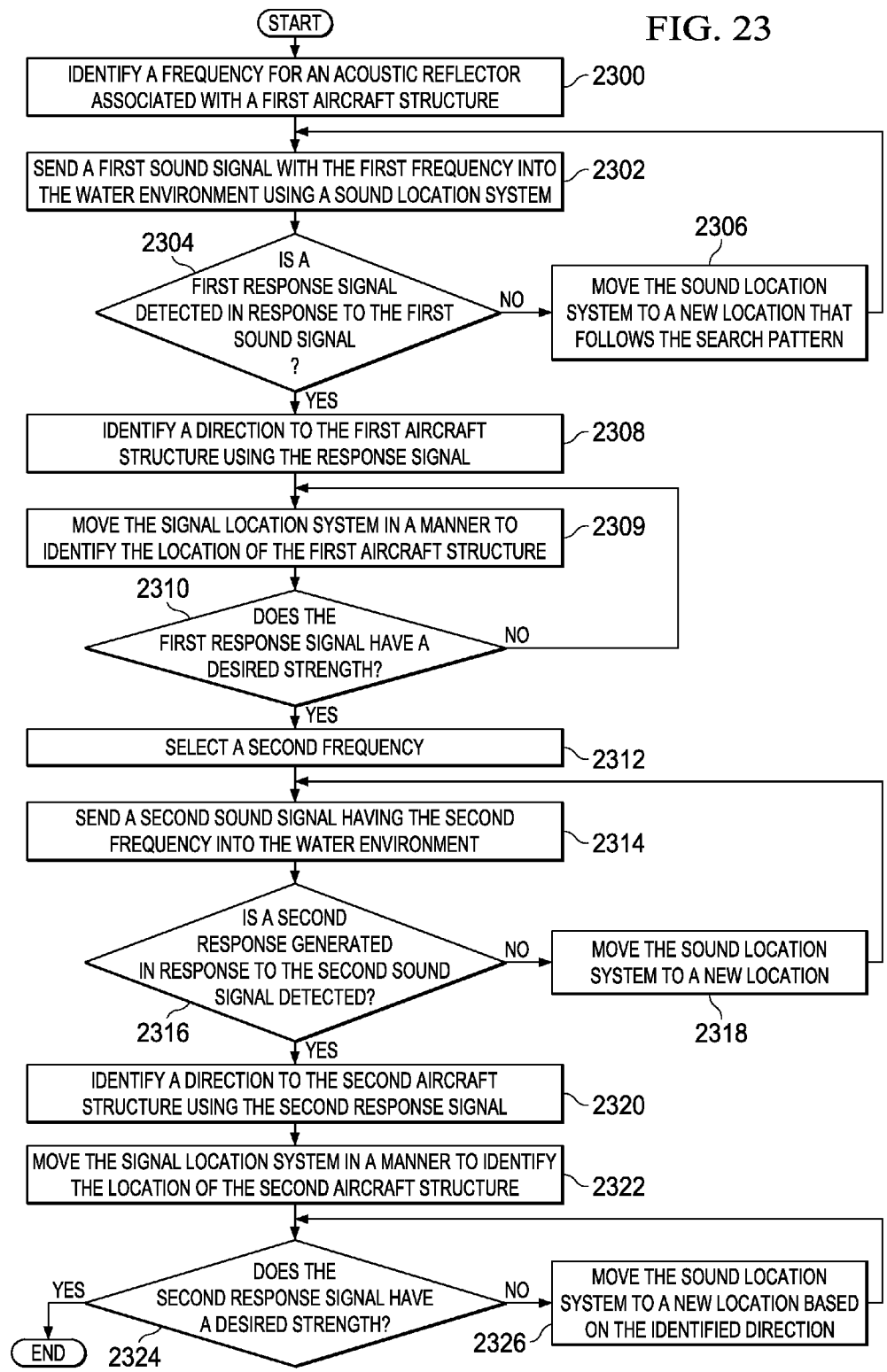
FIG. 23 is an illustration of a flowchart of a process for locating aircraft structures in accordance with an advantageous embodiment.

With reference now to FIG. 23, an illustration of a flowchart of a process for locating aircraft structures is depicted in accordance with an advantageous embodiment. The process illustrated in FIG. 23 may be implemented in aircraft location environment 200 in FIG. 2. In particular, this process may be implemented using aircraft location system 216. Still more particularly, one or more of the different operations may be implemented in signal location system 220.

The process begins by identifying a frequency for an acoustic reflector associated with a first aircraft structure (operation 2300). The first frequency corresponds to a first selected frequency for an acoustic reflector associated with the first aircraft structure. The first aircraft structure is for an aircraft that has unintentionally encountered a water environment. The first aircraft structure may be, for example, a wing of the aircraft.

A first sound signal with the first frequency is sent into the water environment using a sound location system (operation 2302). A determination is made as to whether a first response signal is detected in response to the first sound signal (operation 2304). If a response signal is not detected, the process moves the sound location system to a new location that follows the search pattern (operation 2306). In one illustrative example, operation 2306 may include selecting a new location in a search pattern based on analysis of weather, tide, time elapsed since the unintentional encounter with the water environment, and estimated impact point of the aircraft in the water environment. The process then returns to operation 2302.

If a first response signal is detected, a direction to the first aircraft structure is identified using the response signal (operation 2308). The process moves the signal location system in a manner to identify the location of the first aircraft structure (operation 2309). The movement of the signal location system is in the direction identified for the first aircraft structure in operation 2308.

A determination is made as to whether the first response signal has a desired strength (operation 2310). This desired strength is the strength of the first response signal that identifies the location for the aircraft structure. The threshold also may be a level at which a search for a second acoustic reflector may begin. If the strength of the signal does not meet the desired level, the process returns to operation 2309.

Otherwise, the process selects a second frequency (operation 2312). The second frequency corresponds to a selected frequency for a second acoustic reflector associated with a second aircraft structure. This aircraft structure may be, for example, a data recorder. The process then sends a second sound signal having the second frequency into the water environment (operation 2314).

A determination is made as to whether a second response generated in response to the second sound signal is detected (operation 2316). If the second response is not detected, the process moves the sound location system to a new location (operation 2318), with the process returning to operation 2314 thereafter.

If the second response is detected, the process identifies a direction to the second aircraft structure using the second response signal (operation 2320). The process moves the signal location system in a manner to identify the location of the second aircraft structure (operation 2322). In operation 2322, the signal location system may be moved in a manner that increases an amplitude of the second response signal. This amplitude may be referred to as the strength of the second response signal.

A determination is made as to whether the second response signal has a desired strength (operation 2324). This desired strength is the strength of the second response signal that identifies the location for the aircraft structure. If the second response signal has the desired strength, the process terminates. Alternatively, the process may return to operation 2300 to locate additional aircraft structures. Otherwise, the process moves the sound location system to a new location based on the identified direction (operation 2326), with the process then returning to operation 2324.

In this manner, a signal location system may identify a first reflector associated with a first aircraft structure. This first reflector may have a lower frequency than a second reflector that is to be located. The lower frequency increases the range at which the first reflector can be detected. This lower frequency often results in the first reflector having a larger size than the second reflector having a higher frequency. As a result, the first reflector may be associated with larger aircraft structures as compared to the second reflector. For example, the first reflector may be associated with a wing of the aircraft, while the second reflector may be associated with a black box for the aircraft.

With reference now to FIG. 24, an illustration of a flowchart of a process for locating aircraft structures is depicted in accordance with an advantageous embodiment. This process may be implemented in aircraft location environment 200 in FIG. 2. In particular, this process may be implemented using signal location system 220.

The process begins by selecting an aircraft structure to be located (operation 2400). The process then identifies the frequency for the reflector associated with the aircraft structure (operation 2402).

The process then configures the sound location system to use the selected frequency (operation 2404). The process then transmits a first sound signal having the selected frequency (operation 2406). The first sound signal is transmitted into the water environment.

A determination is made as to whether a first response signal is received (operation 2408). If the first response signal is not received, the process returns to operation 2406.

Otherwise, the process identifies a location of the aircraft structure using the first signals (operation 2410), with the process terminating thereafter. In operation 2410, the sound location system may be moved or the direction in which the sound location system moves may be changed based on the strength of the signal. The process in FIG. 24 may be performed simultaneously for different frequencies by the sound location system or by different sound location systems.

Turning now to FIG. 25, an illustration of a flowchart of a process for identifying the location of aircraft parts is depicted in accordance with an advantageous embodiment. In this illustrative example, the process in FIG. 25 may be implemented in aircraft location environment 200 in FIG. 2. In particular, the process may be implemented using signal location system 220. Signal location system 220 in FIG. 2 may be used in conjunction with signal system 400 in FIG. 4.

The process begins by waiting for a satellite transmission from a signal system (operation 2500). In these illustrative examples, the signal system may include a radio frequency signal generator that generates a signal configured to be received by a satellite system. The system also may include a data device connected to the radio frequency generator. The data device may be configured to store and send information using the radio frequency generator. This information may include, for example, information about the depth of the aircraft structure, an identification of the aircraft structure, and/or other suitable information.

As yet another example, the signal system also may include a global positioning unit. This device may transmit locations of the satellite system.

When the satellite signal is detected, the process identifies a location for the signal (operation 2502). In these illustrative examples, the location may be an approximate one. This location may be identified from coordinates transmitted by the radio frequency signal generator. The radio frequency signal generator may include a global positioning unit that identifies locations of the transmitter.

Thereafter, one or more signal location systems are moved to the location identified (operation 2504). The process then transmits first signals to search for aircraft structures (operation 2506), with the process terminating thereafter. Operation 2506 may be performed by using operations from the flowchart in FIG. 23 and/or FIG. 24. The use of the radio frequency signal generator may provide a location or an approximate location for a particular signal generator.

With reference now to FIG. 26, an illustration of a flowchart of a process for generating signals for use in locating aircraft structures is depicted in accordance with an advantageous embodiment. The process illustrated in FIG. 26 may be implemented in aircraft location environment 200 in FIG. 2. This process may be implemented by signal system 400 in FIG. 4.

The process begins by detecting a selected level of pressure (operation 2600). This pressure is pressure that may be expected to be present after an aircraft encounters a water environment during flight. This pressure may be pressure that is expected when the aircraft structure reaches some selected depth in the water. When the selected pressure is detected, the process operates a retention system to release a radio frequency signal generator (operation 2602). The release of the radio frequency signal generator may be used to provide an initial signal for a location of the aircraft structure.

The process also releases an acoustic reflector (operation 2604), with the process terminating thereafter. In these illustrative examples, the radio frequency signal generator and the acoustic reflector may be released by moving a moveable structure. The moving of the moveable structure may allow these components to move out of a cavity of one or more aircraft structures in which these components are located.

Figure 27:
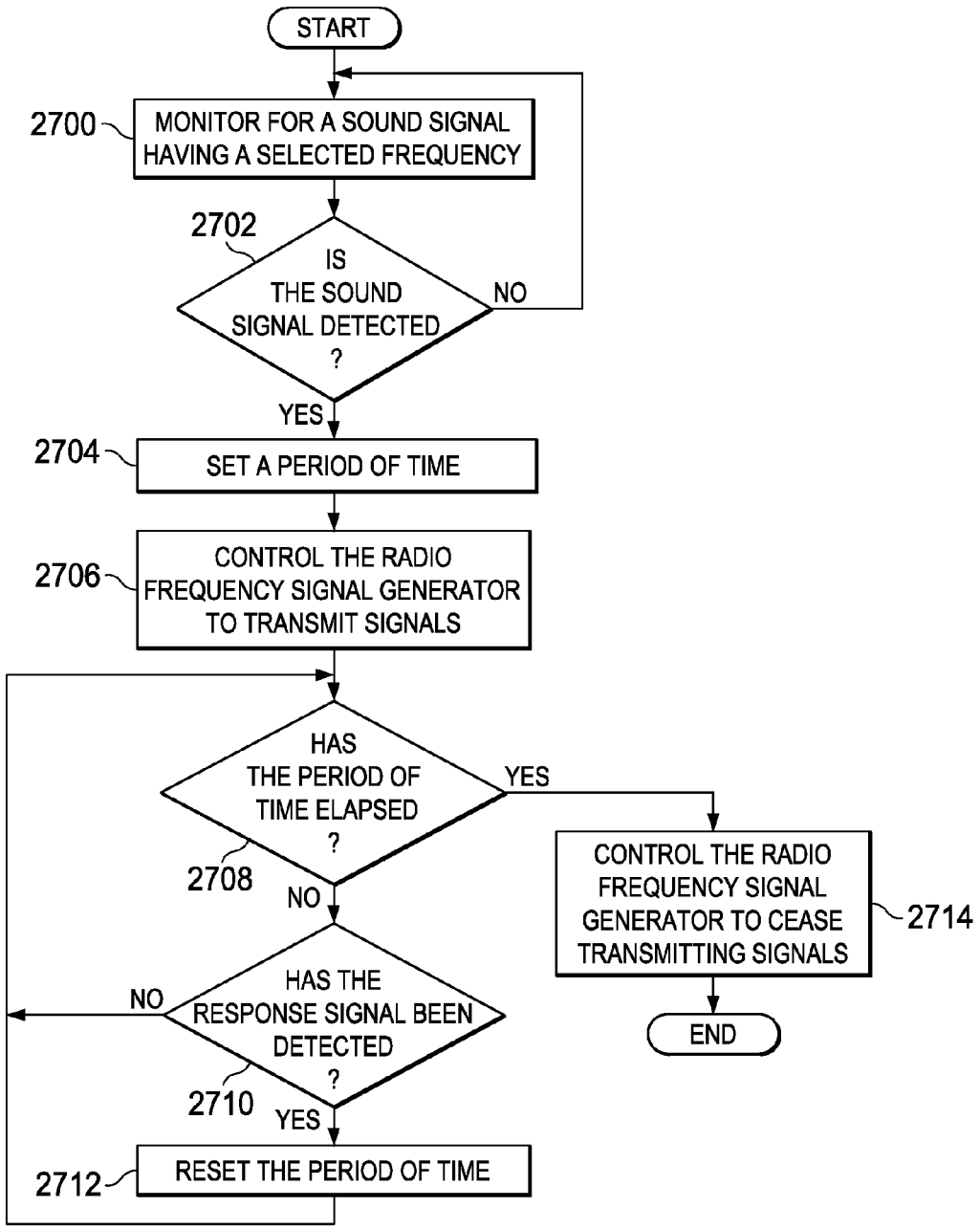
FIG. 27 is an illustration of a flowchart of a process for operating a radio frequency signal generator in accordance with an advantageous embodiment.

With reference now to FIG. 27, an illustration of a flowchart of a process for operating a radio frequency signal generator is depicted in accordance with an advantageous embodiment. In this illustrative example, the process may be implemented by radio frequency signal generator 424 in FIG. 4. In particular, this process may be implemented by controller 430 to control the operation of radio frequency signal generator 424.

The process begins by monitoring for a sound signal having a selected frequency (operation 2700). The selected frequency is a frequency for an acoustic reflector associated with an aircraft structure. The signal generator may be associated with the same or different aircraft structures, depending on the implementation.

A determination is made as to whether the sound signal is detected (operation 2702). If the sound signal is not detected, the process returns to operation 2700.

Otherwise, the process sets a period of time (operation 2704). The process then controls the radio frequency signal generator to transmit signals (operation 2706). These signals may have a number of frequencies.

A determination is made as to whether the period of time has elapsed (operation 2708). If the period of time has not elapsed, the process determines whether the response signal has been detected (operation 2710). If the response signal has not been detected, the process returns to operation 2708. If the signal has been detected, the process resets the period of time (operation 2712). The process then returns to operation 2708.

In operation 2708, if the period of time has elapsed, the process controls the radio frequency signal generator to cease transmitting signals (operation 2714). The process terminates thereafter.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as software, in hardware, or a combination of software and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft location system comprising:
   an aircraft structure;
   a number of acoustic reflectors associated with the aircraft structure, wherein the number of acoustic reflectors is configured to generate first sound signals in response to receiving second sound signals;
   a signal generation system activated by a particular acoustic reflector in the number of acoustic reflectors and generating signals, the number of acoustic reflectors being a passive signal generator and the signal generation system being an active signal generator, the signal generation system comprising:
      a radio frequency signal generator configured to generate a radio frequency signal when activated;
      a detector configured to detect the first sound signals from the number of acoustic reflectors;
      a controller connected to the radio frequency signal generator and the detector, the controller activating the radio frequency signal generator when the detector detects the first sound signals;
   a survivability system associated with the aircraft structure, the number of acoustic reflectors, and the signal generation system, the survivability system configured to lessen a force impacting the number of acoustic reflectors and the signal generation system, wherein the aircraft structure has a cavity in which an acoustic reflector in the number of acoustic reflectors and the signal generation system are located, and wherein the survivability system comprises a foam positioned in the cavity and configured to substantially surround the acoustic reflector and the signal generation system; and
   a moveable structure allowing the number of acoustic reflectors and the signal generation system to move out of the aircraft structure, wherein the cavity and moveable structure are configured such that the acoustic reflector operates after experiencing an encounter of an aircraft with a water environment and the number of acoustic reflectors and the radio frequency signal generator operate under water.

2. The aircraft location system of claim 1, wherein the second sound signals have a frequency in a range selected for locating the aircraft structure.

3. The aircraft location system of claim 1, wherein the number of acoustic reflectors comprises:
   a first acoustic reflector configured to generate the first sound signals having a first frequency; and a second acoustic reflector configured to generate the first sound signals having a second frequency that is different from the first frequency.

4. The aircraft location system of claim 3, wherein the first frequency of the first acoustic reflector is configured to generate the first sound signals having a first range; and the second frequency of the second acoustic reflector is configured to generate the first sound signals having a second range, wherein the first range is longer than the second range.

5. The aircraft location system of claim 1, wherein the radio frequency signal generator generates a radio frequency signal that is detectable by a satellite.

6. The aircraft location system of claim 1, wherein the controller is configured to activate the radio frequency signal generator for a period of time in response to the detector detecting the first sound signals.

7. The aircraft location system of claim 6, wherein the controller is configured to reset the period of time each time the first sound signals are detected.

8. The aircraft location system of claim 6, wherein the period of time is selected to increase an operating time of the radio frequency signal generator.

9. The aircraft location system of claim 1, wherein the aircraft structure has a number of channels connecting an exterior of the aircraft structure to the cavity.

10. The aircraft location system of claim 1 further comprising:
a channel connecting an exterior of the aircraft structure to the cavity; and
the moveable structure configured to open up the channel, wherein water moves through the channel into the cavity when the aircraft structure is underwater.

11. The aircraft location system of claim 10, wherein the moveable structure is configured to open up the channel when the aircraft structure is at least partially underwater in response to a selected level of water pressure, and wherein the acoustic reflector moves out of the cavity through the moveable structure when the moveable structure opens, wherein the radio frequency signal generator is positioned within a second cavity of the aircraft structure and the radio frequency signal generator moves out of the second cavity through the moveable structure when the moveable structure opens.

12. The aircraft location system of claim 11 further comprising:
a first tether having a first end connected to the aircraft structure and a second end connected to the acoustic reflector in the number of acoustic reflectors; and
a second tether having a first end connected to the aircraft structure and a second end connected to the radio frequency signal generator.

13. The aircraft location system of claim 1, wherein the aircraft structure and the survivability system are configured to protect the number of acoustic reflectors from having an unintended encounter with a water environment that has a g-force of up to about 40 g.

14. The aircraft location system of claim 1, wherein the aircraft structure is selected from one of a wing, a horizontal stabilizer, a tail section, an engine housing, and the aircraft.

15. The aircraft location system of claim 1 further comprising:
a sonar-based sound location system configured to send the second sound signals and detect the first sound signals.

16. The aircraft location system of claim 15, wherein an acoustic reflector in the number of acoustic reflectors is configured to generate the first sound signals having a first frequency in response to receiving the second sound signals having the first frequency.

17. The aircraft location system of claim 1, wherein an acoustic reflector in the number of acoustic reflectors has a type selected from one of a sphere, a cylinder, and a triplane reflector.

18. An aircraft location system comprising:
an aircraft structure including a cavity;
a number of acoustic reflectors comprising a first acoustic reflector configured to generate the first sound signals having a first frequency; and a second acoustic reflector configured to generate the first sound signals having a second frequency that is different from the first frequency;
a signal generation system activated by a particular acoustic reflector in the number of acoustic reflectors and generating signals, the number of acoustic reflectors being a passive signal generator and the signal generation system being an active signal generator, the signal generation system comprising:
a radio frequency signal generator configured to generate a radio frequency signal when activated;
a detector configured to detect the first sound signals from the number of acoustic reflectors;
a controller connected to the radio frequency signal generator and the detector, the controller activating the radio frequency signal generator when the detector detects the first sound signals;
a survivability system associated with the aircraft structure and the number of acoustic reflectors, the survivability system configured to lessen a force impacting the number of acoustic reflectors, wherein the aircraft structure has a cavity in which an acoustic reflector in the number of acoustic reflectors is located, and wherein the survivability system comprises a foam configured to substantially surround the acoustic reflector, wherein the cavity is configured such that the acoustic reflector operates after an unintended encounter of an aircraft with a water environment, wherein the aircraft structure is associated with the aircraft and the number of acoustic reflectors operate under water; and
a sound location system disposed in the aircraft structure, configured to send a first sound signal having a first frequency into a water environment, wherein the first frequency corresponds to a first acoustic reflector associated with a first aircraft structure for an aircraft that has encountered the water environment and sends a second sound signal into the water environment using a second frequency when a response signal is received from the first acoustic reflector, wherein the second sound signal corresponds to the second frequency for a second acoustic reflector associated with a second aircraft structure for the aircraft that has encountered the water environment, the first aircraft structure different from the second aircraft structure, the survivability system configured to lessen a force impacting the first and the second acoustic reflectors.

19. The aircraft location system of claim 18, wherein the first aircraft structure comprises a wing and the second aircraft structure comprises a data recorder.

20. The aircraft location system of claim 18 further comprising:
a mobile platform, wherein the sound location system is associated with the mobile platform.

21. The aircraft location system of claim 18 further comprising:
the first acoustic reflector; and
the second acoustic reflector.

22. The aircraft location system of claim 18, wherein the first frequency of the first acoustic reflector is configured to generate the first sound signal having a first range; and the second frequency of the second acoustic reflector is configured to generate the first sound signal having a second range, wherein the first range is longer than the second range.

23. The aircraft location system of claim 18, wherein the first acoustic reflector and the second acoustic reflector have a type selected from one of a sphere, a cylinder, and a triplane reflector.

24. A method for locating aircraft structures, the method comprising:
protecting a number of acoustic reflectors and a signal generation system in a survivability system, the survivability system associated with the aircraft structure, the number of acoustic reflectors and the signal generation system, the survivability system lessening a force impacting the number of acoustic reflectors and the signal generation system with at least a foam positioned in a cavity and surrounding the number of acoustic reflectors, the number of acoustic reflectors located in the cavity, the signal generation system activated by a particular acoustic reflector in the number of acoustic reflectors and generating signals, the number of acoustic reflectors being a passive signal generator and the signal generation system being an active signal generator, the signal generation system comprising:
a radio frequency signal generator configured to generate a radio frequency signal when activated;
a detector configured to detect the first sound signals from the number of acoustic reflectors;
a controller connected to the radio frequency signal generator and the detector, the controller activating the radio frequency signal generator when the detector detects the first sound signals;
opening a moveable structure associated with an aircraft structure, wherein the cavity is configured such that the acoustic reflector operates after an unintended encounter of an aircraft with a water environment;
moving a number of acoustic reflectors and the signal generation system through the moveable structure out of the aircraft structure;
sending a first sound signal into a water environment using a first frequency, wherein the first frequency corresponds to a first selected frequency for a first acoustic reflector associated with a first aircraft structure for an aircraft that has unintentionally encountered the water environment; and
sending a second sound signal into the water environment using a second frequency when a response signal is received from the first acoustic reflector, wherein the second sound signal corresponds to a second selected frequency for a second acoustic reflector associated with a second aircraft structure for the aircraft that has unintentionally encountered the water environment, wherein the first frequency of the first acoustic reflector is configured to generate the first sound signal having a first range; and the second frequency of the second acoustic reflector is configured to generate the first sound signal having a second range, wherein the first range is longer than the second range and the number of acoustic reflectors operate under water, the first aircraft structure different from the second aircraft structure.

25. The method of claim 24 further comprising:
identifying a location of the first aircraft structure using the response signal.

26. The method of claim 24, wherein the response signal is a first response signal and further comprising:
identifying a location of the second aircraft structure using a second response signal.

27. The method of claim 24, wherein the first acoustic reflector and the second acoustic reflector have a type selected from one of a sphere, a cylinder, and a triplane reflector.

28. A method for locating an aircraft structure, the method comprising:
protecting a number of acoustic reflectors and a signal generation system in a survivability system, the survivability system associated with the aircraft structure, the number of acoustic reflectors, and the signal generation system, the survivability system lessening a force impacting the number of acoustic reflectors and the signal generation system with at least a foam positioned in a cavity and surrounding the number of acoustic reflectors, the number of acoustic reflectors located in the cavity, the signal generation system activated by a particular acoustic reflector in the number of acoustic reflectors and generating signals, the number of acoustic reflectors being a passive signal generator and the signal generation system being an active signal generator, the signal generation system comprising:
a radio frequency signal generator configured to generate a radio frequency signal when activated;
a detector configured to detect the first sound signals from the number of acoustic reflectors;
a controller connected to the radio frequency signal generator and the detector, the controller activating the radio frequency signal generator when the detector detects the first sound signals;
opening a moveable structure associated with an aircraft structure;
moving a number of acoustic reflectors and the signal generation system through the moveable structure out of the aircraft structure;
detecting, by a satellite, a radio frequency signal transmitted from the radio frequency signal generator associated with the aircraft structure for an aircraft that has encountered a water environment, wherein the number of acoustic reflectors operate under water;
identifying an approximate location of the aircraft structure from the radio frequency signal;
sending a sound signal into the water environment at a location based on the approximate location of the aircraft structure, wherein the sound signal has a frequency that corresponds to a selected frequency for an acoustic reflector associated with the aircraft structure; and
identifying a location of the aircraft structure when a response signal is received from the acoustic reflector, wherein the location is identified using the response signal.

29. The method of claim 28, wherein the acoustic reflector has a type selected from one of a sphere, a cylinder, and a triplane reflector.

* * * * *